US008620093B2

(12) United States Patent
Nguyen et al.

(10) Patent No.: US 8,620,093 B2
(45) Date of Patent: Dec. 31, 2013

(54) METHOD AND SYSTEM FOR IMAGE REGISTRATION AND CHANGE DETECTION

(75) Inventors: Lam Huy Nguyen, Laurel, MD (US); Trac D Tran, Columbia, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 472 days.

(21) Appl. No.: 12/907,496

(22) Filed: Oct. 19, 2010

(65) Prior Publication Data

US 2011/0222781 A1     Sep. 15, 2011

Related U.S. Application Data

(60) Provisional application No. 61/313,977, filed on Mar. 15, 2010.

(51) Int. Cl.
    *G06K 9/68*    (2006.01)
(52) U.S. Cl.
    USPC ............................................ 382/218; 382/220
(58) Field of Classification Search
    USPC .................................................. 382/218, 220
    See application file for complete search history.

(56) References Cited

U.S. PATENT DOCUMENTS

| 6,075,905 A * | 6/2000 | Herman et al. ............... 382/284 |
| 2009/0010500 A1 * | 1/2009 | Kandaswamy et al. ...... 382/118 |

OTHER PUBLICATIONS

D. Forsyth, P. Torr, and A. Zisserman (Eds.): ECCV 2008, Part II, LNCS 5303, pp. 155-168, 2008.*
Steven M. Scarborough ; LeRoy Gorham ; Michael J. Minardi ; Uttam K. Majumder ; Matthew G. Judge ; Linda Moore ; Leslie Novak ; Steven Jaroszewksi ; Laura Spoldi ; Alan Pieramico; "A challenge problem for SAR change detection and data compression." Proc. SPIE 7699, Algorithms for Synthetic Aperture Radar Imagery XVII, 76990U (Apr. 18, 2010).*
E. Rignot and J. V. Zyl, "Change detection techniques for ERS-1 SAR data," IEEE Trans. on Geoscience and Remote Sensing, vol. 31, No. 4, pp. 896-906, Jul. 1993.
M. Carlotto, "Detection and analysis of change in remotely sensed imagery with application to wide area surveillance," IEEE Trans. on Image Processing, vol. 6, No. 1, pp. 189-202, Jan. 1997.
K. I. Ranney and M. Soumekh, "Signal subspace change detection in averaged multilook SAR imagery," IEEE Trans. on Geo. and Remote Sensing, vol. 44, No. 1, pp. 201-213, Jan. 2006.

(Continued)

*Primary Examiner* — Utpal Shah
(74) *Attorney, Agent, or Firm* — Lawrence E. Anderson

(57) ABSTRACT

A system and method for detecting changes by comparing images which cover the same physical area but are collected at different times, the system comprising: at least one input for inputting an image of a target area; the image of the target area having signatures representing outstanding features; at least one processor operating to divide the image of a target area into a plurality of target subimages; at least one memory comprising reference data comprising reference subimages taken at or near the target area at various times, the at least one processor operating to determine a sparse image representation from the reference data; the sparse image representation of the target data being a linear combination of reference data from corresponding reference subimages stored in the at least one memory; the at least one processor operating to compare the target image to the sparse image representation and to match signatures from the target image to the sparse image representation to register the images and perform change detection.

20 Claims, 23 Drawing Sheets
(12 of 23 Drawing Sheet(s) Filed in Color)

(56) References Cited

OTHER PUBLICATIONS

I. Ranney and H. C. Khatri, "Modified difference change detector for small targets in SAR imagery," IEEE Trans. on Aerospace and Electronic Systems, vol. 44, No. 1, Jan. 2008.

E. Candès and M. Wakin, "An introduction to compressive sampling," IEEE Signal Processing Magazine, vol. 25, No. 2, pp. 21-30, Mar. 2008.

Wright, J, et al., "Robust face recognition via sparse representation," Pattern Analysis and Machine Intelligence, IEEE Transactions on PAMI, Feb. 2009, vol. 31 Issue:2 pp. 210-227 ISSN: 0162-8828 Digital Object Identifier: 10.1109/TPAMI.2008.79, Publication date: Apr. 3, 2008 PubMed ID: 19110489.

J. Tropp and A. Gilbert, "Signal recovery from random measurements via orthogonal matching pursuit," IEEE Trans. on Information Theory, vol. 53, No. 12, pp. 4655-4666, Dec. 2007.

W. Dai and O. Milenkovic, "Subspace pursuit for compressive sensing: Closing the gap between performance and complexity," Preprint, 2008, Download: http://dsp.rice.edu/files/cs/SubspacePursuit.pdf.

M. Preiss and N. J. S. Stacy, "Coherent change detection: theoretical description and experimental results," Australian government technical report, DSTO-TR-1851, 2006.

A Al Muhit, "VLSI Implementation of Discrete Wavelet Transform (DWT) for Image Compression," 2nd International Conference on Autonomous Robots and Agents Dec. 13-15, 2004 Palmerston North, New Zealand.

E. Candes and T. Tao, "Decoding by linear programming," IEEE Trans. on in/ormation Theory, vol. 51, No. 12, pp. 4203-4215, Dec. 2005.

M. A. T. Figueiredo, R. D. Nowak, and S. 1. Wright, "Gradient projection for sparse reconstruction: Application to compressed sensing and other inverse problems." IEEE Journal of Selected Topics in Signal Processing: Special Issue on Convex Optimization Methodsfor Signal Processing, vol. I, No. 4, pp. 586-598, Apr. 2007.

D. Needell and R. Vershynin, "Uniform uncertainty principle and signal recovery via regularized orthogonal matching pursuit", Foundations of Computational Mathematics, vol. 9, No. 3, 317-334, DOI: 10.1007/s10208-008-9031-3 Preprint. 2007.

T. T. Do, L. Gan, N. Nguyen, and T. D. Tran, "Sparsity adaptive matching pursuit algorithm for practical compressed sensing," in Proc. Asilomar Conl on Signals, Systems, and Computers, Pacific Grove, Oct. 2008.

Marc Ressler, Lam Nguyen, Francois Koenig, David Wong, and Gregory Smith, "The Army Research Laboratory (ARL) Synchronous Impulse Reconstruction (SIRE) Forward-Looking Radar," Proceedings of SPIE, Unmanned Systems Technology IX, vol. 6561, May 2007.

S. G. Mallat and Z. Zhang, "Matching pursuits with time-frequency dictionaries." IEEE Transactions on Signal Processing, vol. 41, No. 12, pp. 3397-3415, 1993.

R. Tibshirani, "Regression shrinkage and selection via the lasso," Journal of the Royal Statistical Society. Series B (Methodological), pp. 267-288, 1996.

D. L. Donoho and M. Elad, "Optimally sparse representation in general (nonorthogonal) dictionaries via $\zeta 1$ minimization," Proceedings of the National Academy of Sciences 100.5, pp. 2197-2202, 2003.

\* cited by examiner

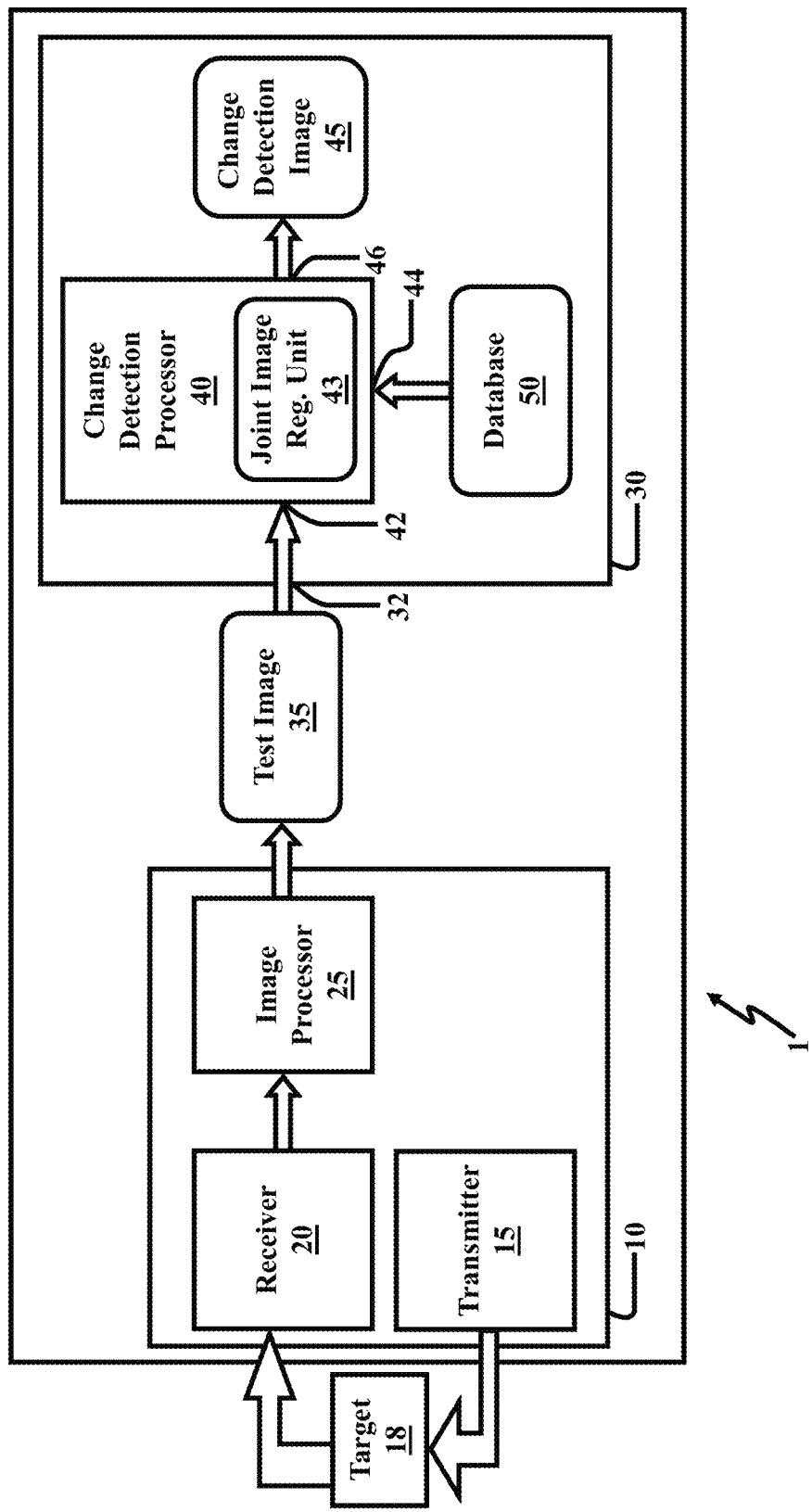

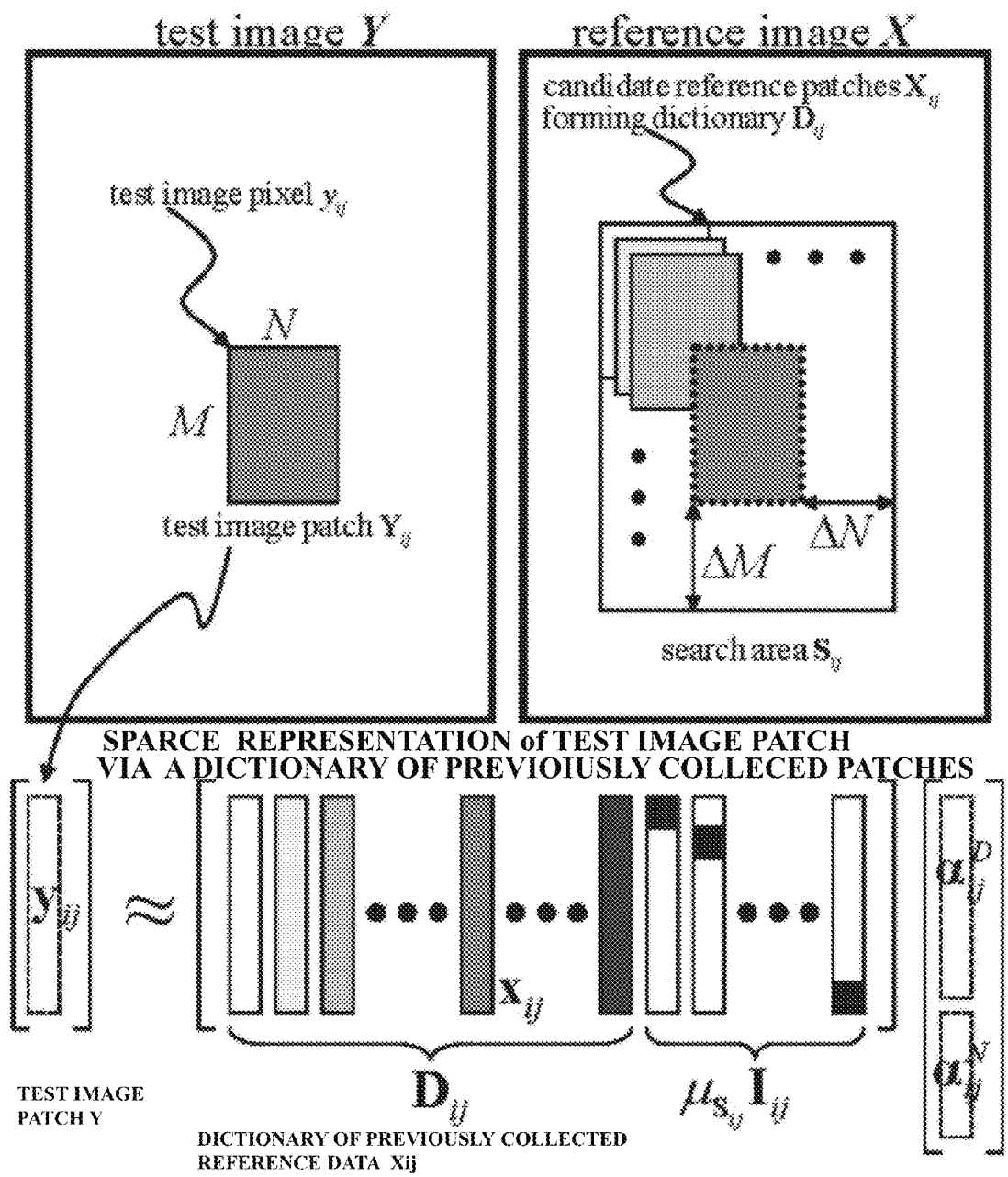
FIG. 2B  SIRE-CD Algorithm Set Up.

$$[I_i] = [IR_{i1} \ IR_{i2} \ \cdots \ IR_{ij} \ \cdots \ IR_{iM}] \begin{bmatrix} \alpha_{ik}^D \end{bmatrix}$$

Reconstructed Image Block | Reference Image Blocks

FIG. 2D

$$\boxed{IC_i} = \frac{\beta_i}{\sigma_{S_i}} \left| \boxed{IT_i} - \boxed{I_i} \right|$$

Change Detection Image Block    Test Image Block    Reconstructed Image Block

L1-norm of $i^{th}$ Test Image Block: $\quad \beta_i = \sum_{k=1}^{M} \left| \alpha_{ik}^{D} \right| + \sum_{k=1}^{N} \left| \alpha_{ik}^{N} \right|$ Variance of $i^{th}$ Search Image Block: $\quad \sigma_{S_i}^{2}$

FIG. 2E

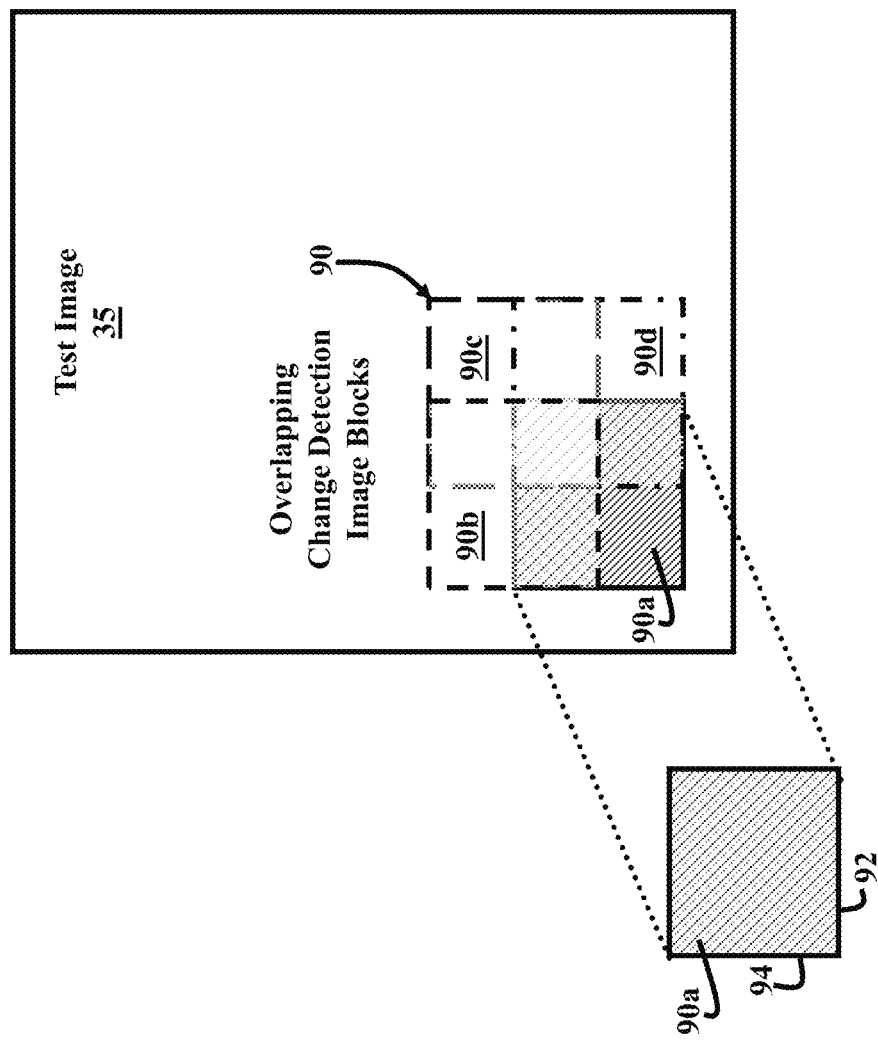

SIMULATION SAR DATA
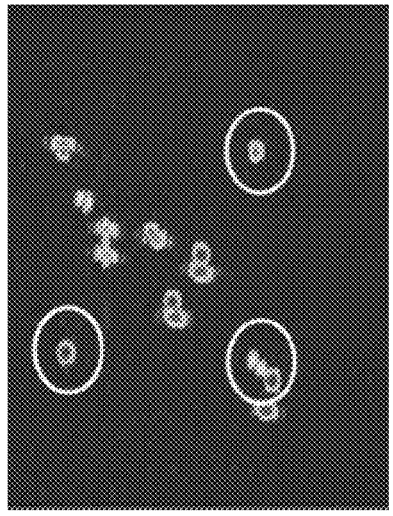
FIG. 8A REFERENCE IMAGE
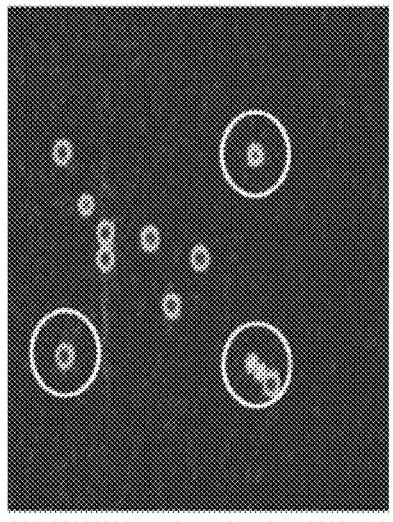
FIG. 8B TEST IMAGE
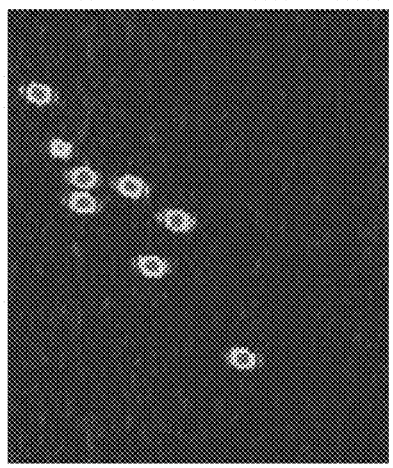
FIG. 8C DIFFERENCE CHANGE DETECTION APPLIED TO TWO IMAGES (WITH GLOBAL IMAGE REGISTRATION)

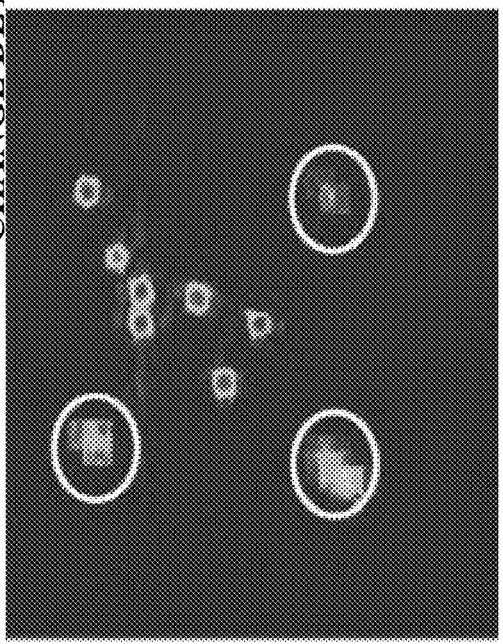
FIG. 9A SPARSE PREDICTION IMAGE Ŷ
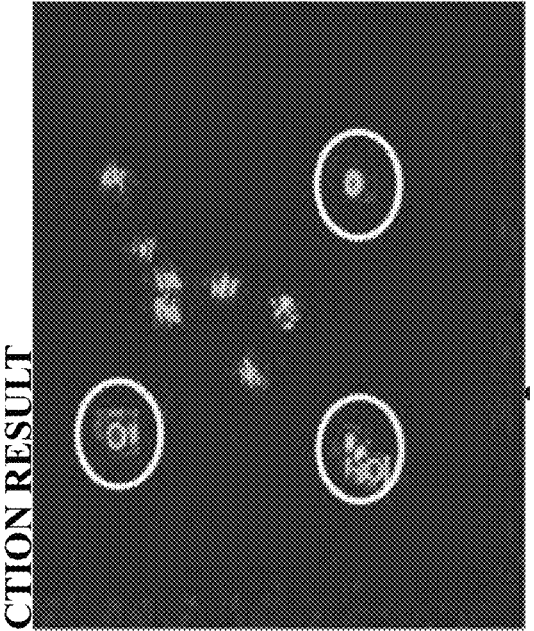
CHANGE DETECTION RESULT
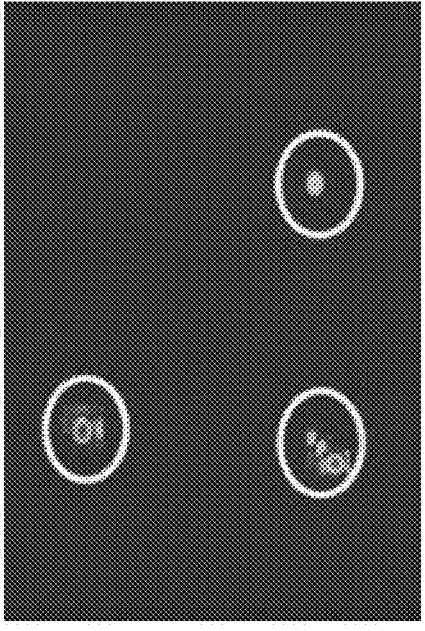
FIG. 9B RESIDUAL ERROR IMAGE E
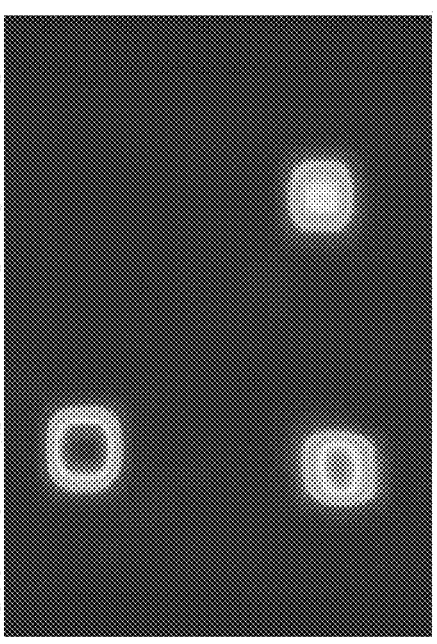
FIG. 9C L1-NORM COEFFICIENT MAP L
FIG. 9D SCALED CHANGE DETECTION IMAGE Ê

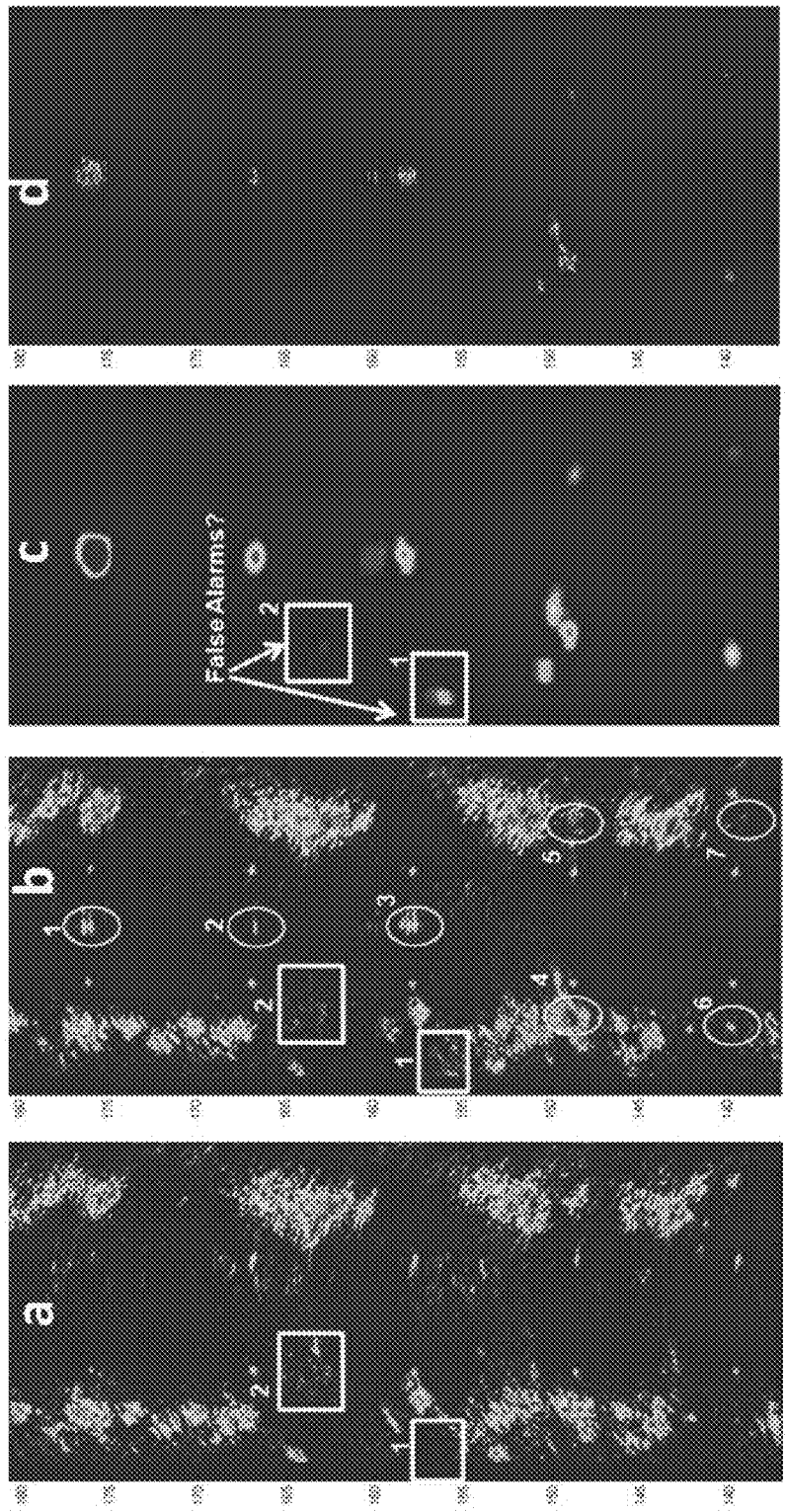

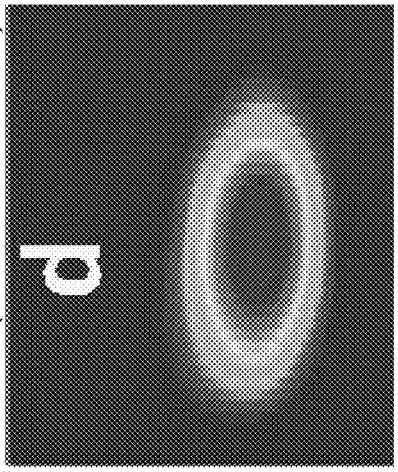
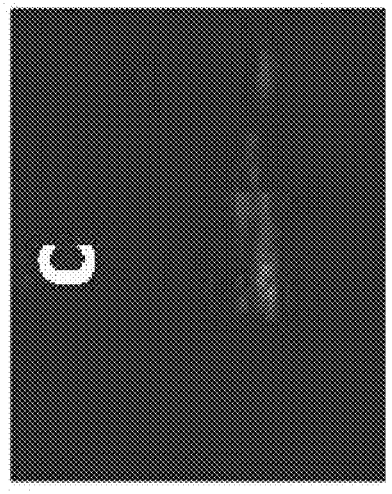
REAL ARL SAR DATA
FIG. 11A REFERENCE IMAGE CHIP (NO TARGET)
FIG. 11B TEST IMAGE CHIP (WITH TARGET)
FIG. 11C SPARSE RECONSTRUCTION
FIG. 11D OPTIMAL L1-NORM MAP $L$ REAL ARL SAR DATA
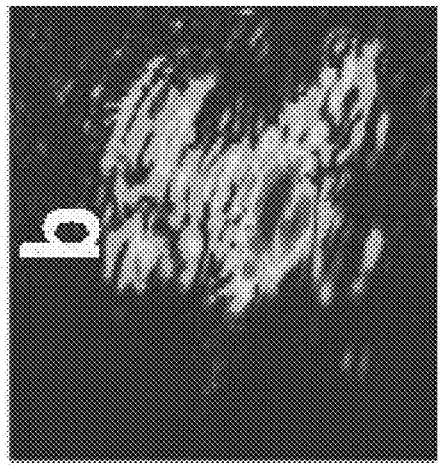
FIG. 12A REFERENCE IMAGE CHIP (CLUTTER OBJECT)
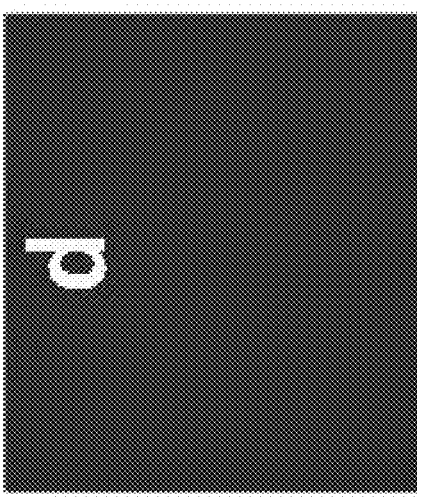
FIG. 12B TEST IMAGE (SAME CLUTTER OBJECT)
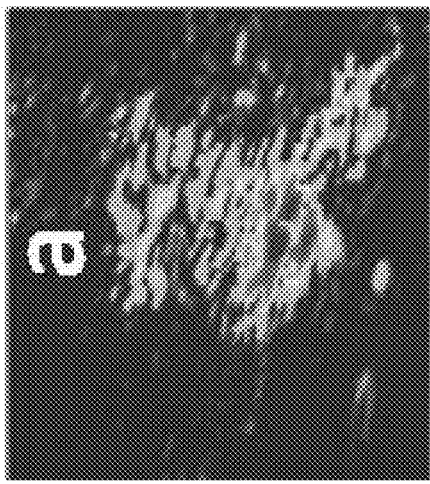
FIG. 12C SPARSE RECONSTRUCTION
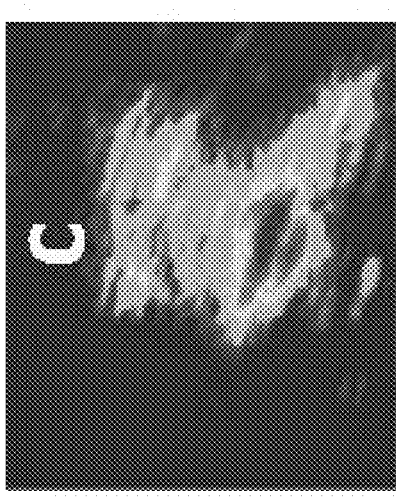
FIG. 12D OPTIMAL L1-NORM MAP $L$ Reference SAR Image Target SAR Image

METHOD AND SYSTEM FOR IMAGE REGISTRATION AND CHANGE DETECTION

STATEMENT OF GOVERNMENT INTEREST

The embodiments herein may be manufactured, used, and/or licensed by or for the United States Government without the payment of royalties thereon.

TECHNICAL FIELD

The embodiments herein generally relate to image processing, and more particularly, to change detection techniques.

BACKGROUND OF THE INVENTION

Change detection is a popular and important image processing process with numerous practical applications such as medical imaging, environment, agriculture, and other remote sensing tasks. There are, however, some significant challenges confronting most change detection systems. The first challenge is image registration. For example, two images—a first image may be referred to as a reference image and a second image may be referred to as a test image in a change detection system or algorithm—are generated at different times. The reference image and the test image, however, are usually not aligned with each other, since the imaging platform is generally not retained in precisely the same exact geometry from one run to another. Performance of change detection often depends on how well image registration can be achieved. Misalignment between the reference image and the test image results in a translation, and even slight rotation, between the reference image and the test image. Although many change detection systems have been developed, the image registration process is typically performed separately (e.g., performed manually). Unfortunately, the performance of a change detection system often depends on how well image registration can be achieved. If alignment was not well performed prior to the application of the change detection algorithm, the resulting change detection performance will be significantly degraded. In addition, the degree of misalignment between the two images usually locally varies throughout large areas.

The second challenge confronting change detection systems relates to the suppression of image signatures from common objects, which appear in both the test and reference image scenes. For example, in an ideal situation, after the two images have been carefully registered, the image signatures of objects present in both the test and reference image would be almost identical. Consequently, the difference in image signatures between the test and reference image should be very small. In other words, the image signatures from common objects that appear in both the test and reference image would be suppressed by the change detection system. In current change detection systems, however, image signatures of the same object are somewhat different in the two images due to many reasons (e.g., calibration problem, slight change in aspect angle, noise, etc.) Differences in image signatures of a common object can lead to false positives since they falsely indicate large difference signatures in the resulting change detection image. These signature differences would be falsely declared as targets of interest (i.e., generate false alarms). Current state-of-the-art change detection algorithms often have difficulty in suppressing these differences since they simply detect any anomalies between the signatures of the objects which are common to the test and reference images.

SUMMARY OF THE INVENTION

A preferred embodiment of the present invention comprises a sparsity-driven image registration and change detection technique for imagery, such as, for example synthetic aperture radar (SAR). The image registration and change detection technique may be embodied in an algorithm that performs two main tasks: (i) locally registers the test and reference images; and (ii) performs the change detection between the two. In this preferred embodiment, the transformation of the signatures from the reference image to match those of the test image at the local image patch level is sparsity driven. A "dictionary" is constructed from the reference data that is used to find the sparsest representation that best approximates the new incoming test data. The accuracy level of the approximation determines the detected changes between the reference and test image.

A preferred embodiment system for performing image change detection comprises an image input for capturing a test image of an area of interest; and a storage or memory for storing a reference image; at least one processor that calculates a sparsity-driven transformation of reference signatures from the reference image to match test signatures of the test image; the input being operatively connected to the at least one processor, wherein the input accepts the test image; and the at least one processor accepts the reference image from memory; and an output port operatively connected to the at least one processor, wherein the output port produces a change detection image.

In such a system, a preferred embodiment may comprise a transmitter that transmits electromagnetic waves; a receiver that receives the electromagnetic waves; and an image processor coupled to the receiver that accepts input data from the receiver. Moreover, the receiver may receive the electromagnetic waves after the electromagnetic waves have been reflected from a target, and the at least one processor may comprise an image processor or a synthetic aperture radar image processor. In addition, the memory or storage unit may comprise a reference image database comprising a plurality of reference images.

The processing steps may begin with a global operation that aligns the most recently collected test image to the set of reference ones. As a global pre-processing operation, the beginning step may maximize the correlation between the reference image and the spatially translated (shifted) test image within a reasonable range and/or minimize the sum absolute difference (SAD) between the spatially translated (shifted) test image and the reference image within a reasonable range. The global pre-processing ensures that the test and the reference image roughly capture the same scene or physical area. In addition, the global pre-processing limits the size of the search area in the following local registration and change detection step; hence, it improves the accuracy as well as the complexity of the local optimization.

In addition, in such a system, the processor(s) performing the change detection may extract a test image block of pixels from the test image. As used herein, the terminology processor or "at least one processor" or processor(s) includes a computer, a microprocessor, a controller, a mainframe, a multiprocessor, or the like, or a plurality of computers, microprocessors, controller, mainframe, multiprocessors, or the like. Moreover, the processor(s) performing the change detection may establish a search area in the reference image, which may comprise many reference image blocks, each of which is a candidate to be compared to the targeted image block in the test image. Furthermore, the at least one processor may stack all shifted reference image blocks within the desired search area into a local dictionary, and each shifted reference image block may correspond to an atom of the dictionary. As used herein, the terminology "dictionary" refers to the storage of reference image patches $X_{ij}$ (in vectorized format $x_{ij}$) that fit within the search area $S_{ij}$.

Additionally, the processor(s) performing the change detection may generate a system of linear equations representing the test image block as a linear combination of shifted reference image blocks (atoms in the dictionary), and the at least one processor may solve the system of linear equations for the sparsest solution (the one with the fewest number of active atoms contributing to the linear model representation). In addition, the processor(s) performing the change detection may construct a new test image block from the shifted reference image blocks. Moreover, the processor(s) performing the change detection may compute a change detection image block by comparing the new test image block with the original test image block and/or may construct a change detection image from change detection image blocks via the error residue of the approximation.

Another embodiment herein provides an apparatus for joint image registration and change detection, the apparatus comprising a first input port that accepts a first image of an area of interest, wherein the first image comprises first image blocks; a second input port that accepts a second image of the area of interest, wherein the second image comprises second image blocks; a global image registration unit via simple correlation; a joint image registration unit that registers image blocks that appear in the first image and the second globally-registered image; and a change detection processor that builds a change detection image by suppressing signatures of common image blocks appearing in the first image and the second image.

In such an apparatus, the joint image registration unit may locally register to a memory coupled to the joint image registration unit a test image block from the first image and reference image blocks from the second image. The joint image registration unit may build a local reference dictionary, and wherein the local reference dictionary comprises shifted reference image blocks. In addition, each shifted reference image block may comprise the reference image block shifted in a predetermined amount along at least one of the reference image down-range dimension and/or the reference image cross-range dimension. Additionally, the change detection processor may identify changes between the first image and the second image by building a system of linear equation computations and solving for a sparse solution to the system of linear equation computations.

The invention includes a preferred method, executed by a computing device, of detecting changes between a test image and a reference image, the method comprising providing the test image and the reference image; globally registering the test image with the reference image via maximizing correlation; extracting a test image block from the test image; establishing a corresponding search area in the reference image; extracting shifted reference image blocks from the search area of the reference image to form a local reference dictionary; generating a system of linear equation computations; solving for a sparse solution for the system of linear equation computations; building a new test image block from the shifted reference image blocks; computing a change detection image block by comparing the new test image block with the original test image block; constructing a change detection image from a plurality of change detection image blocks; and detecting changes between the test image and the reference image from the change detection image.

In such a method, computing the change detection block may comprise computing an absolute difference between the test image block and the reconstructed test image block. Moreover, computing the absolute difference between the test image block and the new test image block may comprise applying a first scaling factor to the test image block, where the first scaling factor comprises a measure of a degree of sparsity of a solution of the system of linear equation computations. In addition, computing the absolute difference between the test image block and the new test image block may comprise applying a second scaling factor to the new test image block, where the second scaling factor comprises a variance of an $i^{th}$ search area block among a plurality of search area blocks in the reference image.

Furthermore, in such a method, generating the system of linear equation computations may comprise building a test image block column vector and building a plurality reference image block column vectors. Moreover, generating the system of linear equation computations may comprise solving for an unknown column vector, and where the unknown column vector represents the sparsest scaling factors associated with the individual shifted reference image blocks in the local reference dictionary. In addition, solving for the sparsest solution for the system of linear equation computations may comprise finding a solution vector, and wherein the number of nonzero components of the solution vector must not exceed a predetermined restriction value. Moreover, solving for the sparsest solution for the system of linear equation computations may comprise finding a solution vector wherein the sum of the absolute values of the components of the solution vector must be minimal.

Another embodiment herein provides a method, executed by a computing device, of performing change detection of images, the method comprising providing a test image and a reference image; setting change detection parameters by: setting a test image patch size to M×N, where M is a first numeric value along a down-range dimension and N is a second numeric value along a cross-range axis; setting a targeted sparsity level to a numeric value typically between 0.02 MN and 0.05 MN; setting a search window size to (M+ΔM)×(N+ΔN), where ΔM is a first added numeric value that is added to the first numeric value and ΔN is a second added numeric value that is added to the second numeric value; and setting δ, such that $\delta_i$=M/2; $\delta_j$=N/2, where δ is an overlap between test image patches; partitioning the test image into overlapping test image patches; processing the overlapping test image patches by: constructing a local dictionary from the reference image; computing a sparse prediction patch; and computing residual prediction errors; and incrementing i and j of $\delta_i$ and $\delta_j$ to cover an entire area of the test image, where i is an integer value along a down-range dimension of the test image and j is an integer value along a cross-range dimension of the test image; and outputting a global prediction, a coefficient map, and a scaled change detection image to detect a change between the test image and the reference image.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In FIGS. 8-19 the colors represent a decibel range which ranges from red to blue, red being the strongest signal and blue being the weakest.

Figure 2A:
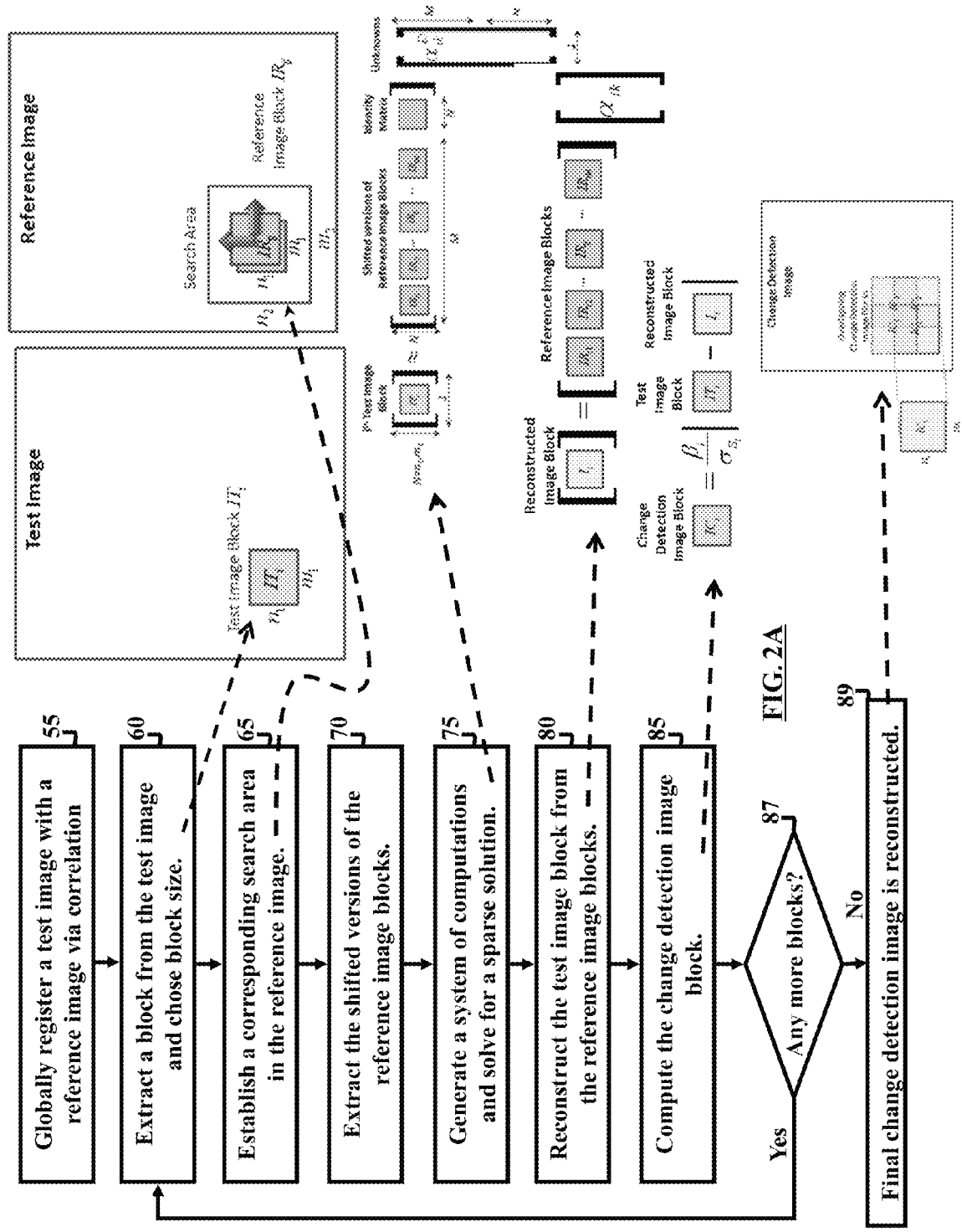
Figure 2C:
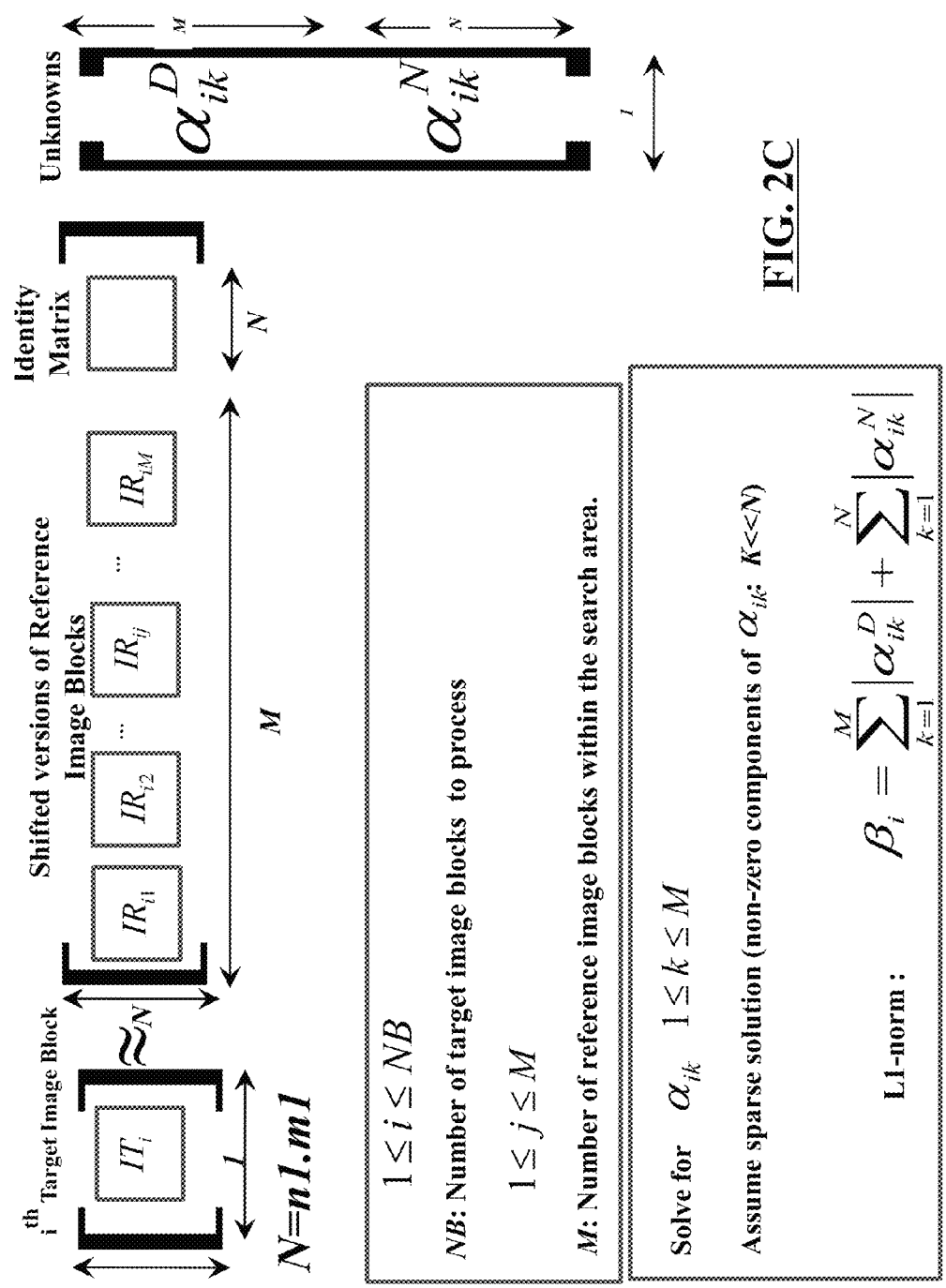
Figure 4:
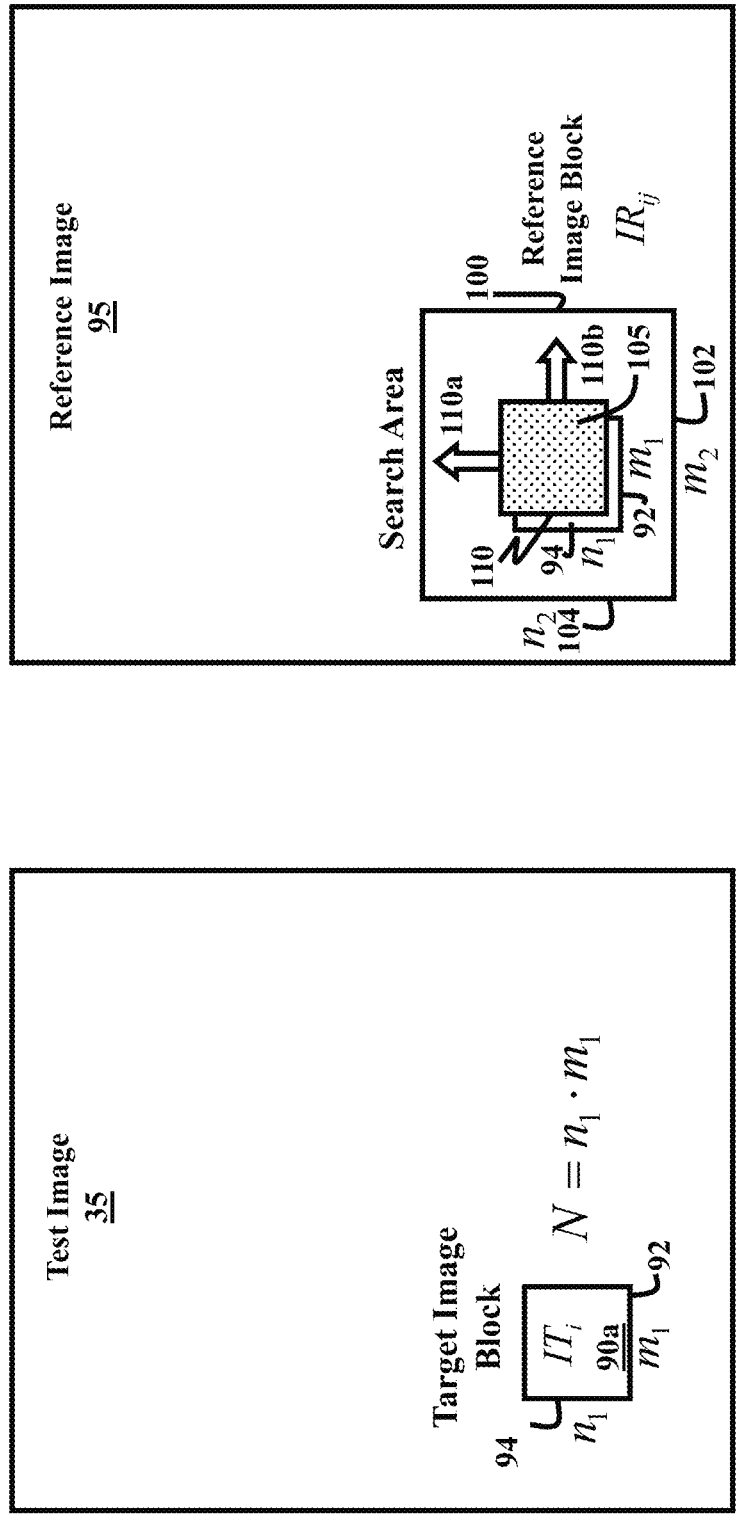
Figure 5:
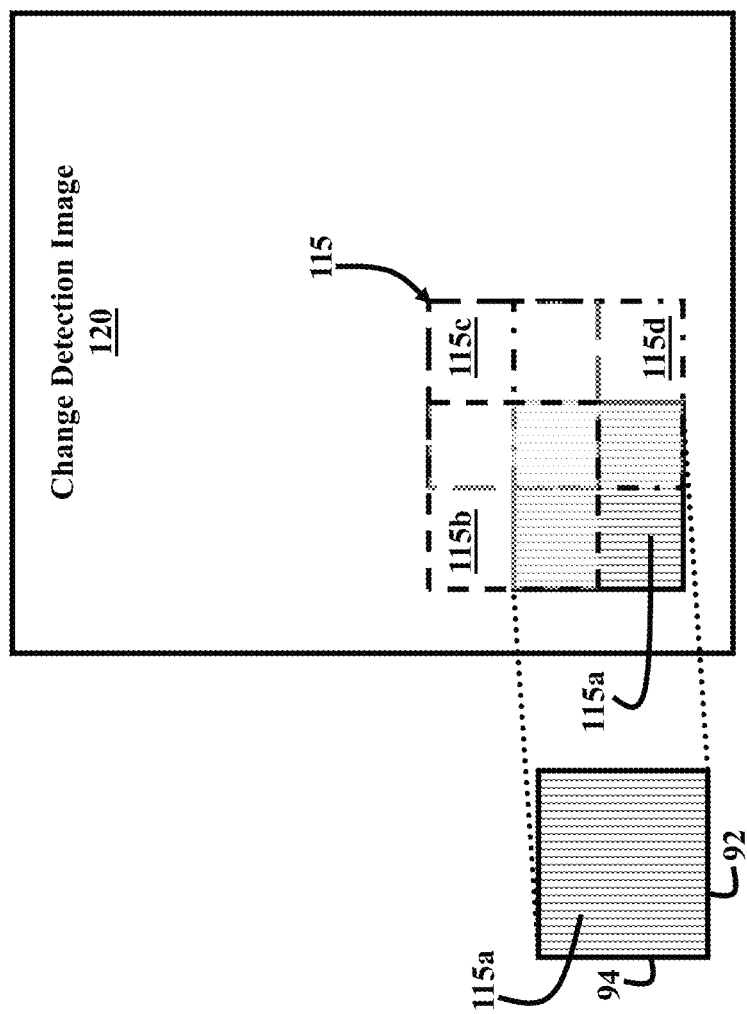
Figure 6:
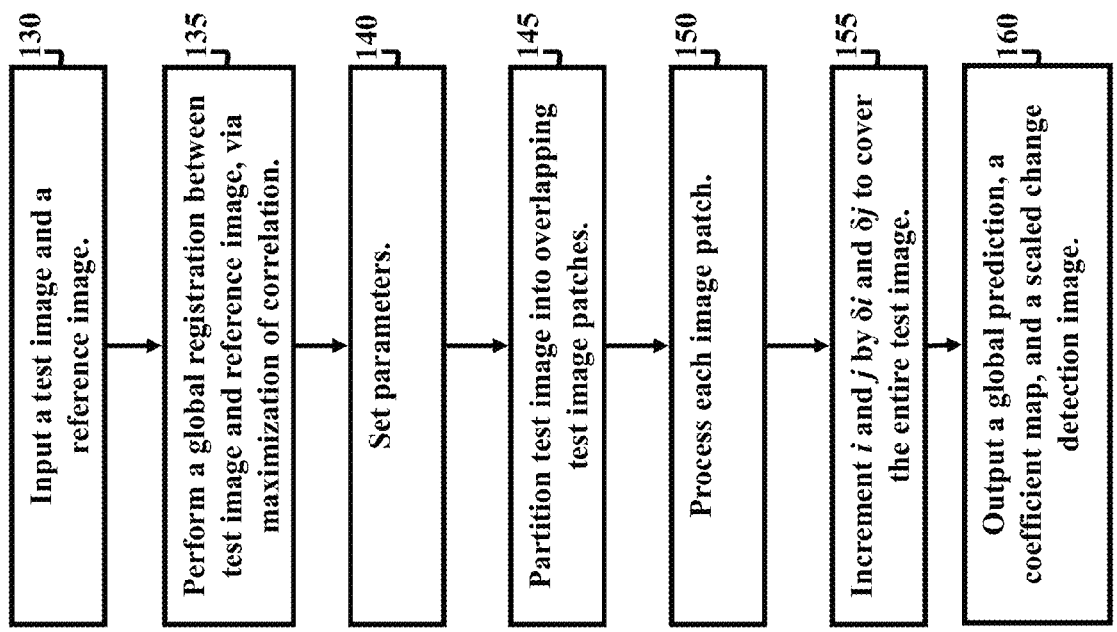
Figure 7:
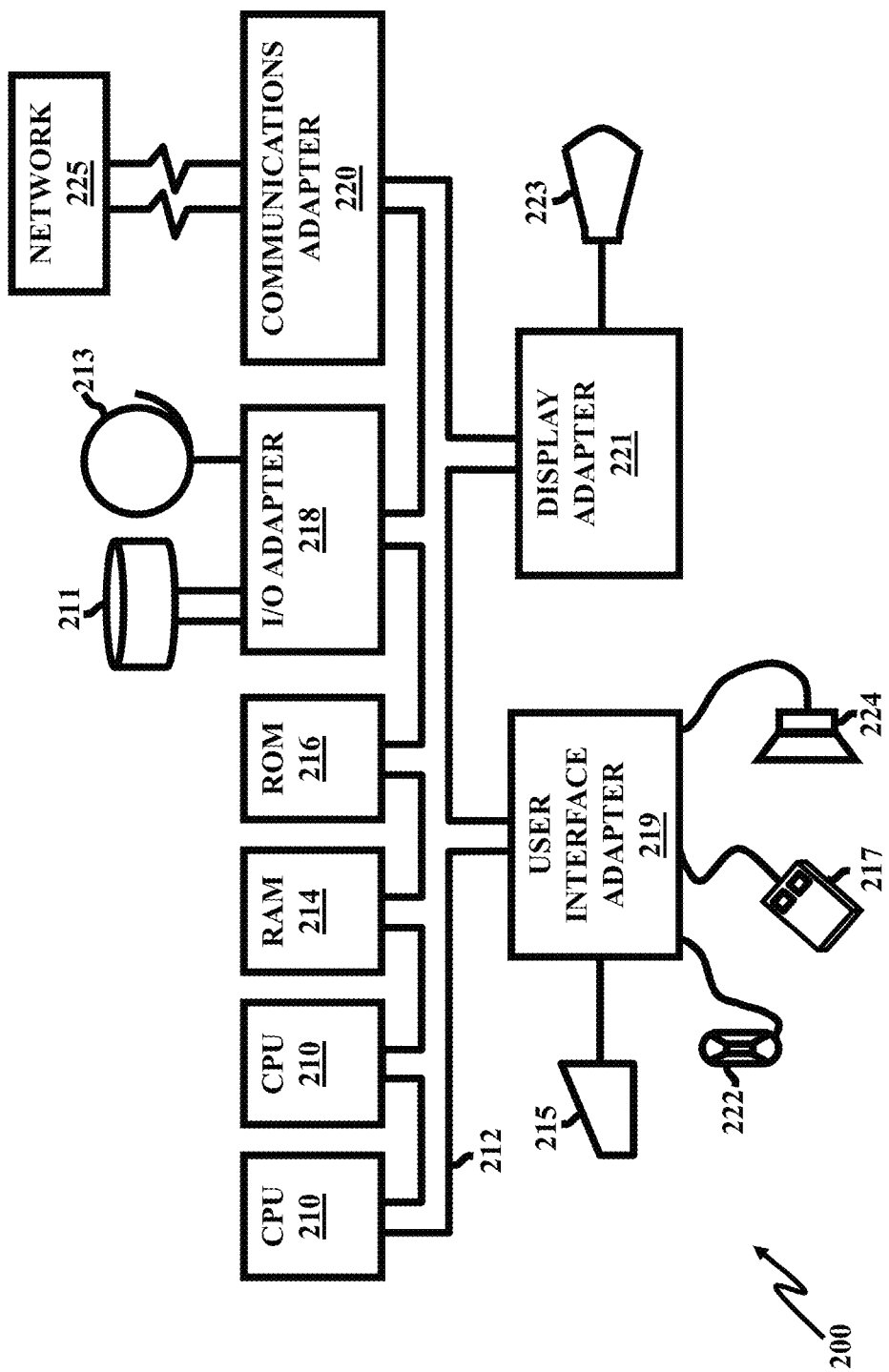

The embodiments herein will be better understood from the following detailed description with reference to the drawings, in which:

FIG. 1 illustrates a schematic diagram of a joint image registration and change detection system according to an embodiment herein;

FIG. 2A illustrates a flow diagram of a method of joint image registration and change detection, executed by a change detection processor, according to an embodiment herein;

FIG. 2B illustrates an Sparsity-Driven Image Registration and Change Detection (SIRE-CD) algorithm set up;

FIG. 2C is a diagrammatic illustration of the formulation and relationship of the target image block and the reference image blocks;

FIG. 2D is a diagrammatic illustration of relationship of the reconstructed image block and the reference image blocks;

FIG. 2E is a diagrammatic illustration of the formulation and relationship of a change detection image block relative to a target image block and reconstructed image block;

FIG. 3 illustrates a schematic diagram of a test image according to an embodiment herein;

FIG. 4 illustrates a schematic diagram of a test image and a reference image according to an embodiment herein;

FIG. 5 illustrates a schematic diagram of a change detection image according to an embodiment herein;

FIG. 6 illustrates a flow diagram of a joint image registration and change detection method according to an embodiment herein;

FIG. 7 illustrates a schematic diagram of a computer architecture used in accordance with the embodiments herein.

Figure 13A:
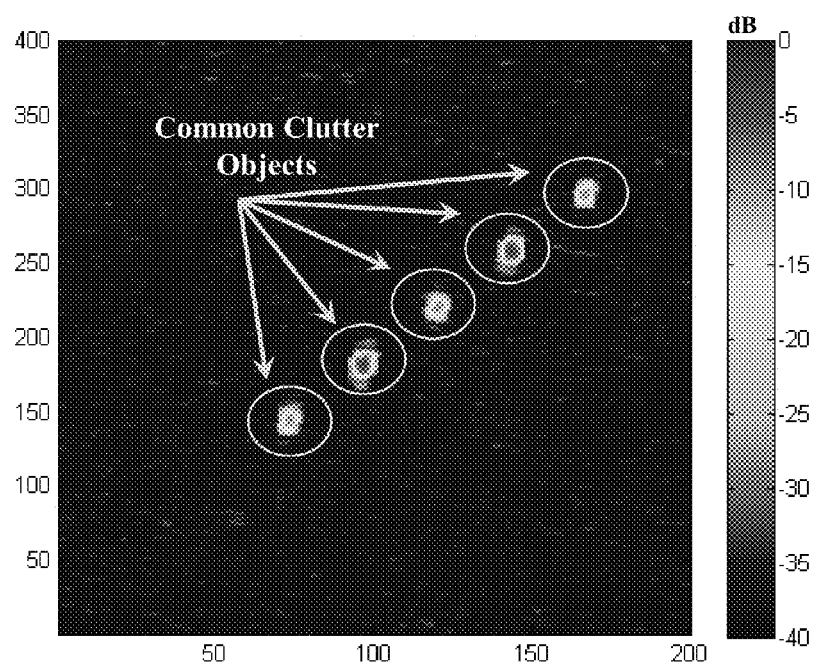
Figure 13B:
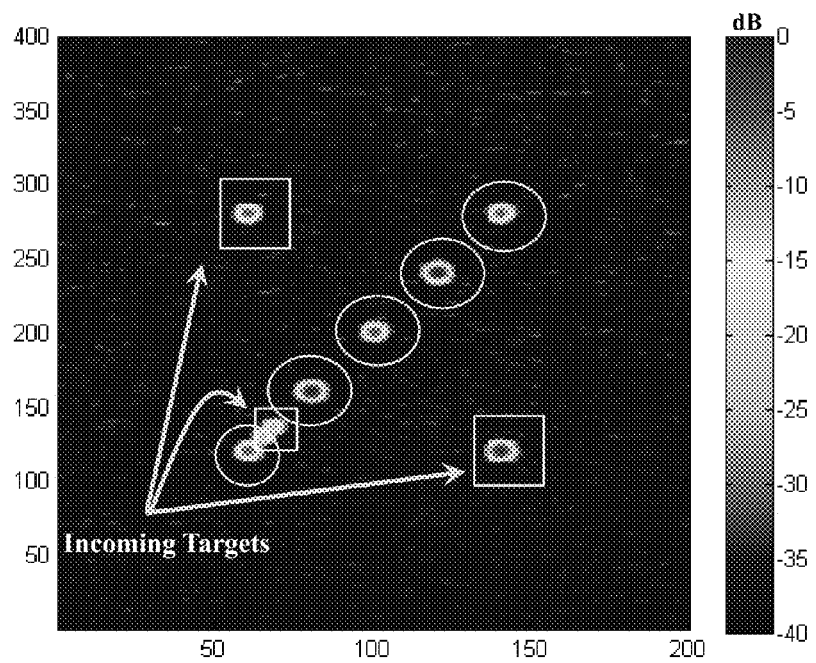
Figure 14:
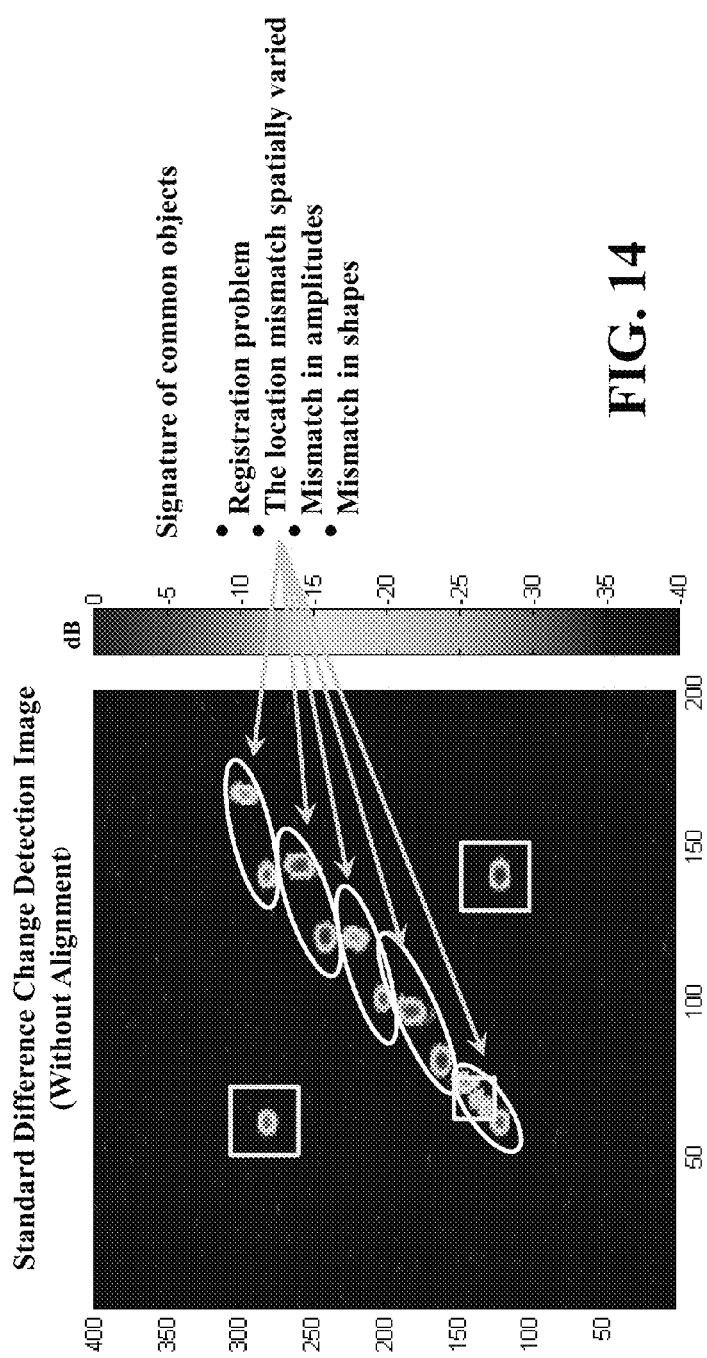
Figure 15:
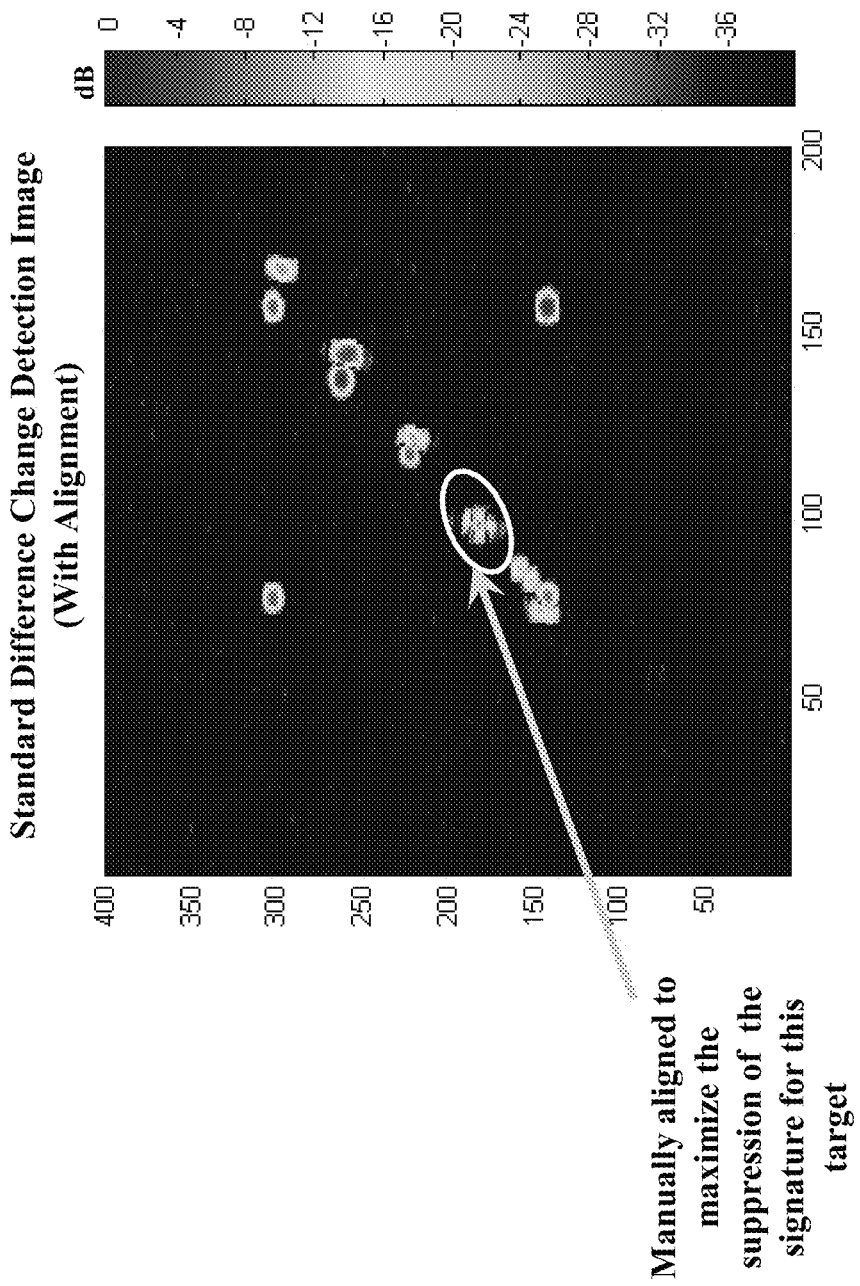
Figure 16:
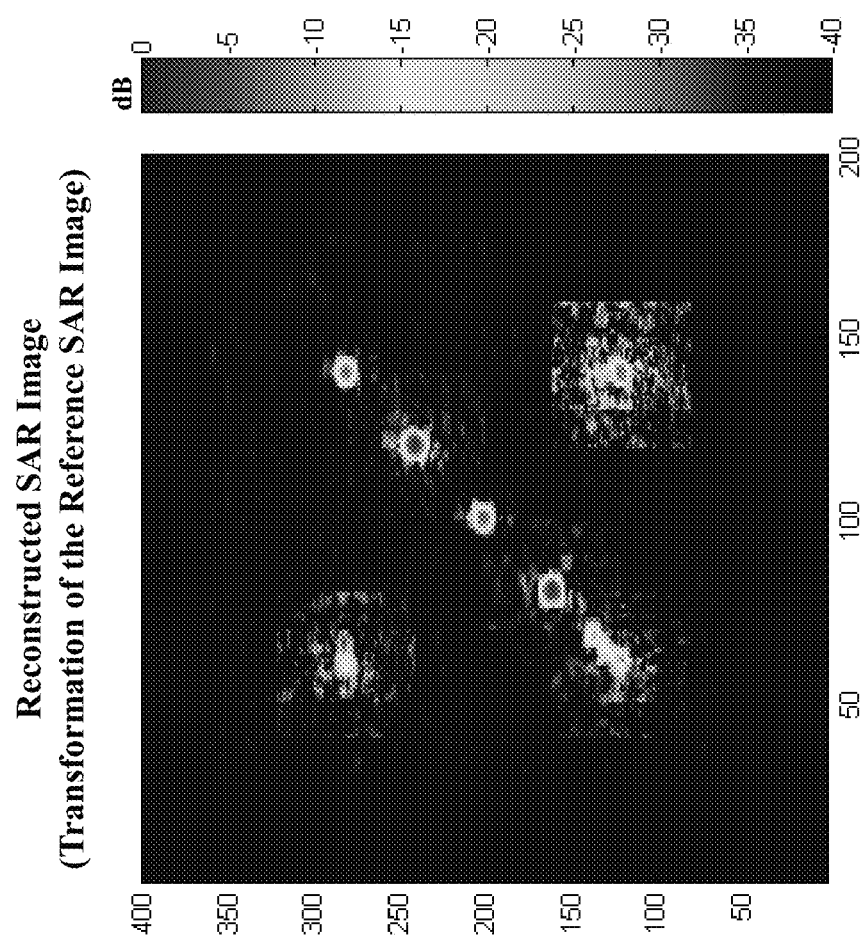
Figure 17:
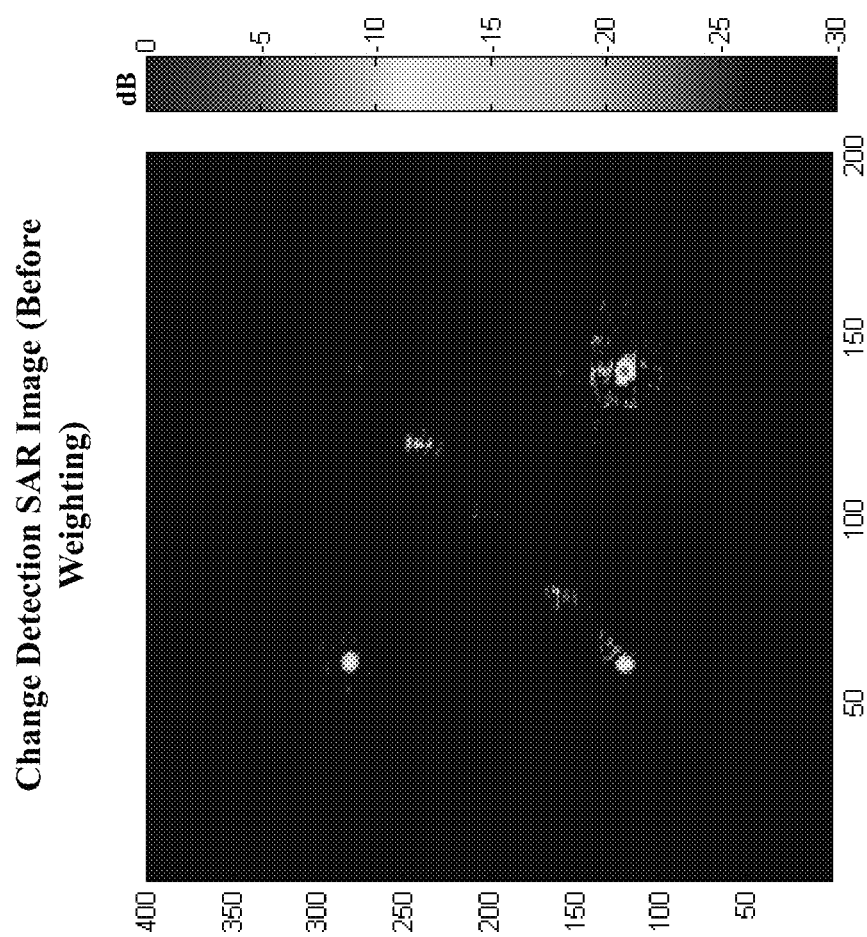
Figure 18:
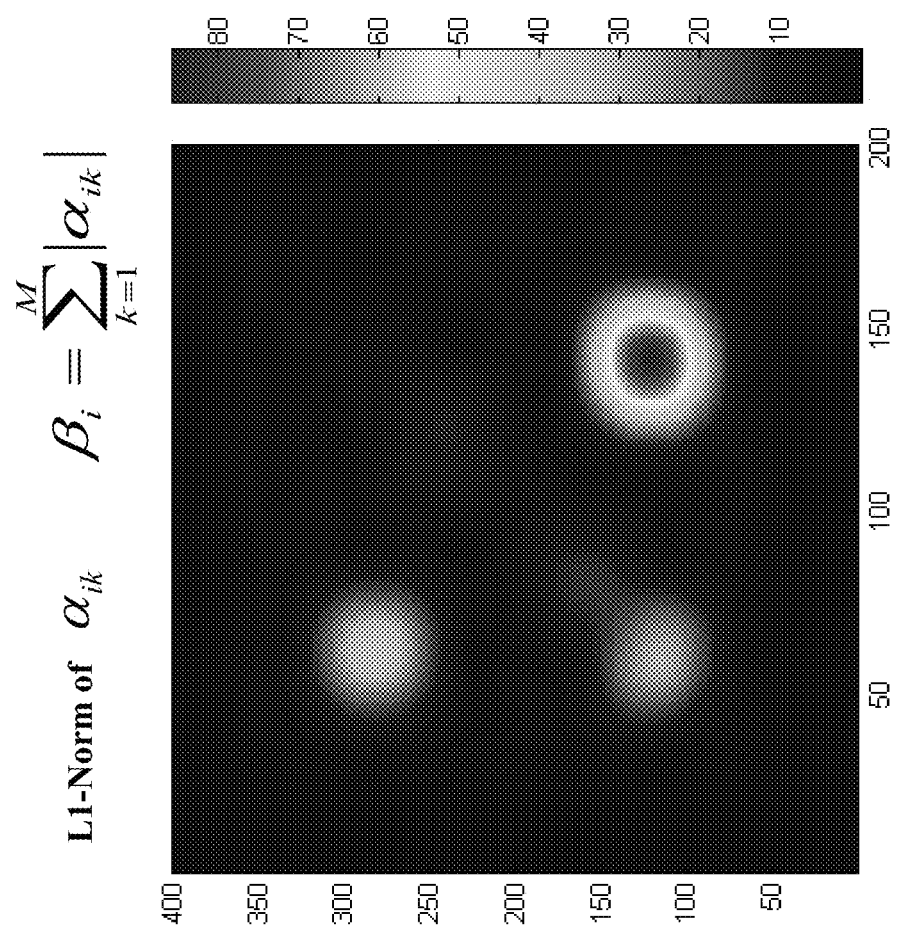
Figure 19:
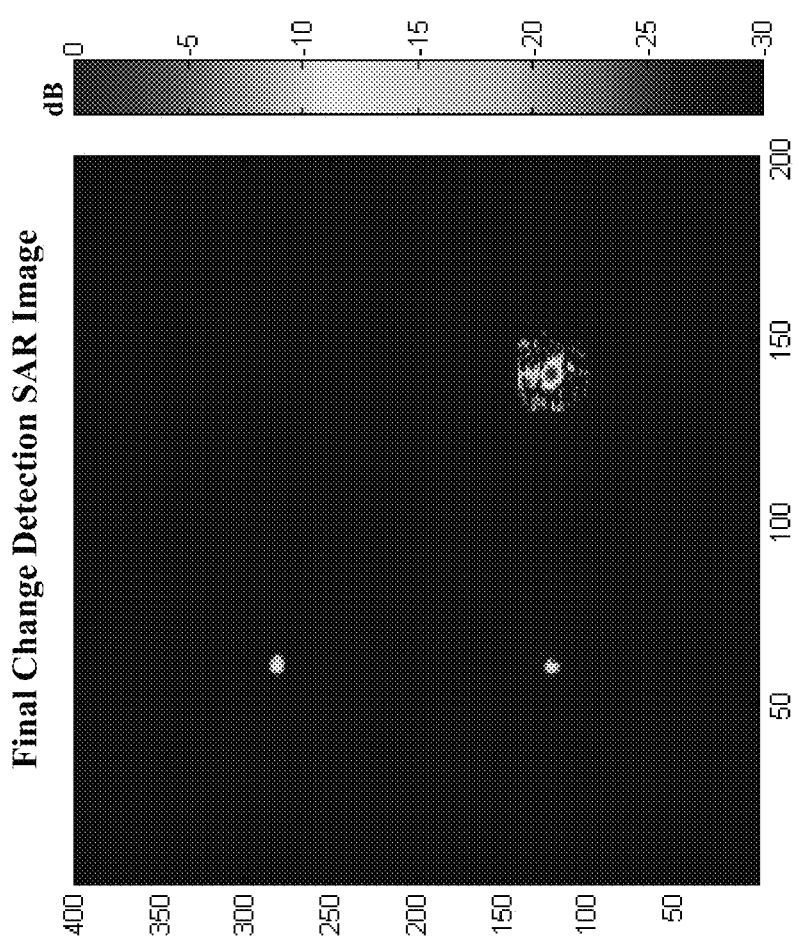

FIG. 8A is an illustration of a reference image formed using SAR simulation reference data;

FIG. 8B is an illustration of a test image for SAR simulation reference data that is collected at a different time (than that of FIG. 8A) with three new targets introduced to the scene;

FIG. 8C is an illustration of the standard difference change detection result (after a manual global image registration process);

FIG. 9A is an illustration of a sparse prediction image $\hat{Y}$ (reconstruction image; using SIRE-CD);

FIG. 9B is an illustration of the residual error image E (difference between the test image and the reconstructed image);

FIG. 9C is an illustration of L1-norm coefficient map L (which shows the false color plot of the Li-norm coefficients);

FIG. 9D is an illustration of scaled change detection image $\acute{E}$ (the final change detection image using $L_1$ weighting information);

FIG. 10A is an illustration of a reference image X using real data from the ARL UWB forward looking SAR;

FIG. 10B is an illustration of a test Y using real data from the ARL UWB forward looking SAR;

FIG. 10C is an illustration of the L-1 norm of optimal coefficient map L;

FIG. 10D is an illustration of the change detection image $\acute{E}$ (residual image E scaled by L1-norm and standard deviation of reference search area);

FIG. 11A is an illustration of a reference image chip (incoming target not present) (formed using real ARL SAR data);

FIG. 11B is an illustration of a test image chip (with target) (formed using real ARL SAR data);

FIG. 11C is an illustration of sparse image reconstruction of the target signature from the reference image data (formed using real ARL SAR data);

FIG. 11D is an illustration of the L1-norm false color map (optimal L1-norm map L) (formed using real ARL SAR data);

FIG. 12A is an illustration of a reference image chip (clutter object) (formed using real ARL SAR data);

FIG. 12B is an illustration of a test image chip (same clutter object) (formed using real ARL SAR data);

FIG. 12C is an illustration of sparse image reconstruction of the test clutter from the reference clutter signature (formed using real ARL SAR data);

FIG. 12D is an illustration of the L1-norm map L (formed using real ARL SAR data);

FIG. 13A is an illustration of a reference SAR image showing clutter (encircled) (the first image in a sequence of FIGS. 13A-19);

FIG. 13B is an illustration of a target SAR image showing targets (in squares) and clutter (encircled) (the second image in the sequence of FIGS. 13A-19);

FIG. 14 is an illustration of standard difference change detection without alignment (the third image in the sequence of FIGS. 13A-19);

FIG. 15 is an illustration of standard difference change detection with alignment (the fourth image in the sequence of FIGS. 13A-19) (The scale is in relative dB);

FIG. 16 is an illustration of a transformed reference SAR image (reconstructed SAR image) using the principles of the present invention (the sixth image in the sequence of FIGS. 13A-19);

FIG. 17 is an illustration of a change detection SAR image (before weighting) using the principles of the present invention (the seventh image in the sequence of FIGS. 13A-19);

FIG. 18 is an illustration depicting an L1-norm of $\alpha_{ik}$ using the principles of the present invention (the eighth image in the sequence of FIGS. 13A-19);

FIG. 19 is an illustration depicting a final change detection SAR image performed using the principles of the present invention (the last image in the sequence of FIGS. 13A-19).

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide the option of a joint image registration and change detection system and method. For example, embodiments described herein locally register reference and test images, and perform change detection analysis between the two images. Referring now to the drawings, and more particularly to FIGS. 1 through 19, where similar reference characters denote corresponding features consistently throughout the figures, there are shown preferred embodiments.

In the following mathematical equations, bold face characters denote vectors while bold-faced uppercase characters denote matrices.

A preferred embodiment of the invention comprises a sparsity-driven transformation of the signatures from the reference image to match to those of the test image. Each local patch in the reference image may be transformed for comparison with the local corresponding region in the test images. The process may be performed simultaneously to perform image registration and perform suppression of common signatures that are presented in both images (test and reference). Conceptually, a subspace is constructed from the reference data and that subspace is used to approximately represent the new incoming test data. A redundant dictionary may be constructed from the reference data and the dictionary is used vis-à-vis the new incoming test data as depicted in FIG. 2B. The accuracy level of this representation determines the detected changes between the reference and the test image. The concept of sparsity in this preferred embodiment approach contains a principal component analysis (PCA) flavor in that only the most influential signatures are allowed to contribute to the linear approximation. However, unlike classic PCA approaches, the process is deterministic: the algorithm operates directly on the collected data without the necessity of costly computation of eigenvectors and/or eigenvalues. The methodology avoids effort consumed in "training" the dictionary. The subspace approach is locally adaptive: at the image patch level, a search is performed for the optimal subspace that can be constructed from the reference data via a sparsity-guidance optimization process. This search feature may accomplish both critical tasks of registration and change detection simultaneously. The algorithm may simultaneously addresses both problems of registration and suppression of common objects via a series of local sparse optimization processes.

Image Registration

In addition to the good suppression of the common signatures, the image registration between the two images is automatically provided by the signature transformation process. The technique can achieve a very robust and almost perfect registration between the two images even for severe situations in which the degree of misalignment is spatially varied throughout the large image scene since an adaptive search for the best match is performed between the test and the reference image at the local image patch level.

Suppression of Signatures from Common Objects (in Both Images)

The basic idea is that the algorithm tries to match the signatures from the reference image to the corresponding signatures from the test image. As used herein, the terminology "signature" is used to denote a distinctive mark; such as the representation of a target, an outstanding feature, or a point of interest in image produced by radar, for example. The signatures from the test image are modeled as a linear combination of the shifted versions of the corresponding signatures in the reference image. The best representations via these linear combinations are called the predicted signatures. However, a further restriction may be imposed on the optimization process to solve only for the sparse solution, in which the prediction of the test image from the reference image would not be exact and also highly dependent on the local reference data. Consider for example, two hypothetical situations. In the first hypothetical situation, there is no change in the image scene. The signatures from the two images can still be different (due to changes in radar calibration, slight variation in geometry, etc.) but the difference is not significant. In this case the algorithm can easily transform the signatures from the reference image to match to the corresponding signatures from the test image and the resulting prediction should be accurate. With an accurate match, the result is the good suppression of the signatures from common objects in both images. In the second hypothetical situation, if a target is only presented in one image and not in the other, the differences between the input signature and the predicted one from the reference would be much more significant. The transformation of the signatures from the reference image to match to the corresponding signatures from the test image would be less successful in this case (in fact, ideally, one would expect the process to fail completely) because of the sparsity-level restriction that is imposed. This results in the detection of the change between the two images.

Another innovative concept in a preferred embodiment technique is that change detection can be performed on multiple reference images while generally state-of-the-art change detection techniques only detect the differences between just two images. This technique can employ more than one reference images to generate the necessary dictionary for the transformation process. The algorithm's performance would be even better since a richer dictionary would capture more variations of the signatures from the same object. For example, in the context of a SAR application, the system transmits radar signals to illuminate an area of interest. The system captures the return radar data and form a SAR image of the area to generate a test image. At this point, the system should already have a database that includes another SAR image (or many SAR images) that was previously collected and generated from this same area. This image is used as a reference image for the change detection process. The two images are sent to the change detection subsystem for processing. The processing steps performed by the change detection system are described by the flowchart in FIG. 2A.

In the following analysis, bold-faced lowercase characters to denote vectors while bold-faced uppercase characters to denote matrices. The lowercase subscripts i and j used herein to index the image pixel as in $x_{ij}$ or image patch location $X_{ij}$. The Lp-norm of the vector $\alpha$ is defined as $\|\alpha\|_p = \sqrt[p]{\sum |\alpha_i|^p}$ whereas the $L_0$-norm of $\alpha$ is simply its number of significant (non-zero) elements.

Sparsity-Constrained Joint Image Registration and Change Detection

A COMPRESSED SENSING (CS) FRAMEWORK is defined as follows. A length-N signal x is said to be K-sparse (or K compressible) if x can be well approximated using K<<N coefficients under some linear transform (e.g. DWT, DFT, or some constructed dictionary). Such a data stream x can be acquired through a series of incoherent linear projections $$y = \Phi x \quad \text{(Equation 1A)}$$

where y is the vector with M entries containing the measurements and $\Phi$ represents an M×N incoherent sensing matrix. According to the embodiments herein, using the CS framework x can be faithfully recovered from only M=O(K log N) measurements via solving the following sparsity driven problem $$\hat{\alpha} = \arg\min \|\alpha\|_0 \; s.t. \; y = \Phi x = \Phi \Psi \alpha = A\alpha \quad \text{(Equation 2A)}$$

and the original signal can be reconstructed as $x^* = \Psi \alpha^*$ where $\Psi$ is the sparsity driven transform constructed from data patches. It is noted that the sparsity K changes from patch to patch.

In mathematics, the $L^p$ spaces are function spaces defined using natural generalizations of p-norms for finite-dimensional vector spaces. They are sometimes called Lebesgue spaces. The $L_p$-norm of the vector $\alpha$ is defined as $\|\alpha\|_p = \sqrt[p]{|\alpha_i|^p}$ whereas the $L_0$-norm of $\alpha$ is the number of significant (non-zero) elements. Under several mild conditions well-known in the literature, the $L_0$-norm minimization problem above can be efficiently solved by recasting it as a convex linear programming problem $\hat{\alpha} = \arg \min \|\alpha\|_1$ s.t. $y = \Phi x = \Psi \Phi \alpha = A\alpha$ (Equation 3A). In any case, the reconstructed information can be generally regarded as the sparsest (or most compressible) solution from many candidate solutions of the under-determined Equation 1A.

Sparse Representation via Reference Data. Shown in FIG. 2B are two SAR images X and Y, which cover the same physical area but are collected at two different times. It would be desirable to register the two images X and Y, and then identify any changes between them. The test image Y is first divided into many overlapping image patches $Y_{ij}$, each represented as an M×N matrix whose upper-left element is image pixel $y_{ij}$, $$Y_{ij} = \begin{bmatrix} y_{i,j} & \cdots & y_{i,j+N-1} \\ \vdots & \ddots & \vdots \\ y_{i+M-1,j} & \cdots & y_{i+M-1,j+N-1} \end{bmatrix} \quad (1)$$

From (1), define $y_{ij}$ as an MN×1 column vector constructed from stacking N columns of $Y_{ij}$ on top of each other. Next, define the corresponding (M+2ΔM)×(N+2ΔN) search area $S_{ij}$ in the reference image X as follows $$s_{ij} \equiv \begin{bmatrix} x_{i-\Delta M, j-\Delta N} & \cdots & x_{i-\Delta M, j+\Delta N+N-1} \\ \vdots & \ddots & \vdots \\ x_{i+\Delta M+M-1, j-\Delta N} & \cdots & x_{i+\Delta M+M-1, j+\Delta N+N-1} \end{bmatrix}. \quad (2)$$

From the above search area Sij, we construct the dictionary Dij which consists of (2ΔM+1)(2ΔN+1) atoms, each atom of exactly the same dimension as the test vector yij, $$D_{ij} = [x_{i-\Delta M, j-\Delta N} x_{i-\Delta M, j-\Delta N+1} \ldots x_{i-\Delta M+1, j-\Delta N} \ldots x_{i+\Delta M, j+\Delta N}] \quad (3)$$

where each MN×1 atom $x_{ij}$ is constructed by vectorizing the image patch $X_{ij}$ from the reference data X. In other words, the dictionary Dij contains the reference image patches $X_{ij}$ (in vectorized format $x_{ij}$) that fit within the search area $S_{ij}$ as defined in (2). The input signal is called K-sparse (K<<MN) if it can be represented accurately as a linear combination of only K atoms from $D_{ij}$.

Sparse Optimization

For every given test image patch $x_{ij}$, the following inverse problem is solved for the sparsest coefficient vector $\alpha_{ij}$ $$y_{ij} = [D_{ij} \; \mu s_{ij} I_{ij}] \begin{bmatrix} \alpha_{ij}^D \\ \alpha_{ij}^N \end{bmatrix} \equiv A_{ij} \alpha_{ij} \quad (4)$$

where Sij μ is the mean of the reference search area $S_{ij}$ in (2) and $I_{ij}$ is the size-MN identity matrix that is employed to account for noises and any real changes as in J. Wright, et al. "Robust face recognition via sparse representation," IEEE Trans. on PAMI, vol. 31, February 2009 (hereinafter Wright et al.), hereby incorporated by reference. According to Wright, et al., the theory of sparse representation helps predict how much occlusion the recognition algorithm can handle and how to choose the training images to maximize robustness to occlusion.

Continuing, the following problem is solved $$\hat{\alpha}_{ij} = \arg \min \|\alpha_{ij}\|_0 \text{ such that } y_{ij} = A_{ij}\alpha_{ij} \quad (5)$$

and the sparsest approximation possible of the test image patch yij is found as a linear combination of the corresponding local reference image patches xij stored in the dictionary Dij $$\hat{y}_{ij} = D_{ij} \hat{\alpha}_{ij}^D. \quad (6)$$

There are numerous techniques for solving (5) for the sparsest solution available in the compressed sensing community: linear programming, orthogonal matching pursuit, gradient projection, subspace pursuit, etc. For example, in a preferred embodiment, subspace pursuit is employed (as described further in W. Dai and O. Milenkovic, "Subspace pursuit for compressive sensing: Closing the gap between performance and complexity," Preprint, 2008) due to its low complexity and its robust performance. The reference W. Dai and O. Milenkovic, "Subspace pursuit for compressive sensing: Closing the gap between performance and complexity," Preprint, 2008 (download http://dsp.rice.edu/files/cs/SubspacePursuit.pdf) is hereby incorporated by reference as though fully reprinted herein.

Change Detection via Residual Error and L1-norm

Several measures of prediction error are defined as follows $$e_{ij} = |y_{ij} - \hat{y}_{ij}|, \; e'_{ij} = \|\hat{\alpha}_{ij}\|_1 e_{ij}, \; e''_{ij} = \|\hat{\alpha}_{ij}\|_1 e_{ij}/\sigma_{s_{ij}} \quad (7)$$

where $s^2 S_{ij}$ is the variance of the reference search area $S_{ij}$. The accuracy of the sparse representation above and the degree of sparsity roughly measured as the L1-norm of the optimal coefficient vector $\|\hat{\alpha}_{ij}\|_1$ are useful information used to determine if changes have taken place within the image area near image location ij or not. Consider the first hypothesis where there is no change in the image scene. In the ideal noiseless case, if the signatures from the test image and the reference image are identical, the solution $\hat{\alpha}_{ij}$ vector would include only one nonzero element of unity magnitude. In reality, there are always subtle changes between the signatures from the two images. Thus, the optimal solution $\hat{\alpha}_{ij}$ would include a few nonzero small-magnitude elements to compensate for the differences and its L1-norm is insignificant. On the other hand, when there are true changes within the local image scene, the test image patch cannot be well represented by the linear combination of reference atoms in the dictionary (since we impose the restriction that sparsity K is very low compared to the dimension of the test image patch). This yields a noisy prediction and the resulting differences would indicate the changes. Here, the resulting L1-norm of the best solution $\hat{\alpha}_{ij}$ would be significantly higher, indicating a detected change.

A preferred embodiment algorithm comprises the following:

Inputs: reference image X and test image Y
Parameter settings:
Image patch size: M×N=1×1 to 2×2 m
Targeted sparsity level: K=0.02 MN to K=0.05 MN
Search window size: ΔM=M, ΔN=N
50% overlap between image patches: δi=M/2; δj=N/2
Partition test image Y into overlapping test image patches
For each test image patch Yij
    Construct local dictionary Dij from the reference as in (3)
    Solve the $L_0$-norm optimization problem in (4)-(5)
    Compute the sparse prediction patch as in (6)
    Compute the residual prediction errors from (7)

Increment i and j by δi and δj to cover the entire test image. Outputs: The global prediction $\hat{Y}$, L1-norm coefficient map L, and scaled change detection $\hat{E}$ image are generated from averaging all local patches $\hat{y}_{ij}$, $\|\hat{\alpha}_{ij}\|_1$, $\hat{e}_{ij}$, respectively, in overlap-add fashion.

The sparsity setting K controls the trade-off between detection versus false-alarm rate. A higher sparsity setting will generally always lead to lower residual error, hence improving clutter suppression but unfortunately also weakening target detection. The size of the search area controls the robustness of the algorithm with respect to registration. With this set-up, SIRE-CD can effectively handle any translational registration mismatch within the range [±ΔM,±ΔN]. However, enlarging the search area size can potentially increase the misdetection rate. The increment settings δi and δj provide the trade-off between refinement and complexity. They can range from unity (moving image patch one pixel at a time—most accurate detection) to M, N (non-overlapped patches—lowest computational requirement).

FIG. 1, with reference to FIG. 4, illustrates a schematic diagram of a change detection system 1 according to an embodiment herein. As shown, change detection system 1 includes an image acquisition unit 10 and a change detection unit 30. Note that the two units may be part of the same component, such as a processor or processors, without departing from the scope of the present invention. Image acquisition unit 10 acquires images and such images may include synthetic aperture radar (SAR) images, medical images, environmental imaging (e.g., thermal characteristics of a geographically defined area), agricultural applications (e.g., tracking grow patterns of particular crops) or remote sensing tasks (e.g., quality assurance within a factory), among other types of images. As further shown in FIG. 1, image acquisition unit 10 optionally includes components for a SAR system; such SAR components may include a transmitter 15, a receiver 20, and a SAR image processor 25. Image acquisition unit 10 captures image data of an area of interest. Areas of interest depend on the particular application of change detection system 1 and may include, but are not limited to a portion of a geographic landscape captured by a SAR system or may include a particular organ captured by a medical imaging device. For example, image acquisition unit 10 is shown as a SAR system in FIG. 1 that captures, via receiver 20, reflected radar information, which may be in the form of electromagnetic waves, originally transmitted by transmitter 15 and reflected off a target 18. Thereafter, image acquisition unit 10 may use SAR image processor 25 to form a SAR image of an area of interest and generate a test image 35 of the area of interest. Test image 35 is then passed to change detection unit 30 (e.g., through input port 32) as input to change detection processor 40 (e.g., through input port 42).

Also shown in FIG. 1 is a database 50 comprising reference images (e.g. reference image 95, shown in FIG. 4), which may include images previously captured by image acquisition unit 10 and saved by change detection unit 30 and onto database 50. For example, reference image 95 (shown in FIG. 4) may include a SAR image (or many SAR images) previously collected and saved, where reference image 95 is an image of a similar area of interest captured by image acquisition unit 10 when creating test image 35 but not necessarily the same image as test image 35. Reference image 95 (shown in FIG. 4) may be subsequently stored in database 50 and later retrieved from database 50 to be used as a second input to change detection processor 40 (e.g., through input port 44). As shown, change detection processor 40 may process input accepted from input port 42 (e.g., test image 35) and input port 44 (e.g., reference image 95) to produce an output (e.g., change detection image 45) through output port 46. Input ports 42, 44 and output port 46 may include, but are not limited to physical ports, memory addresses to a memory (not shown) accessible to change detection processor 40, and virtual ports that change detection processor recognizes as input ports 42, 44 and output port 46. Input port 32 may be similarly configured. Change detection processor 40 may also include a joint image registration unit 43 to register images accepted from the input ports (e.g., input port 42 and input port 44) and store the registrations locally within the change detection processor. For example, joint image registration unit 43 may locally store registrations within a memory (not shown) directly coupled to change detection processor 40.

FIG. 2A, with reference to FIGS. 1 and 3-7, illustrates a flow diagram of a method of change detection that may be processed by change detection processor 40, according to an embodiment herein. The method shown in FIG. 2A may also be executed by a general purpose central processing unit 210 (shown in FIG. 7). Step 55 describes globally registering a test image with a reference image via correlation and may operate as a global registration step via correlation maximization. In step 60, the method of FIG. 2A describes extracting a block (e.g., a grouping of pixels that describes an object of interest within the area of interest captured by image acquisition unit 10—as described in further detail below) from the test image 35. Step 65 describes establishing a corresponding search area (e.g., a search boundary, which is optionally larger than the block extracted from test image 35 in step 55) in the globally-registered reference image 95. Step 70 describes extracting the shifted versions of the reference image blocks by extracting a reference image block and subsequently shifting the reference image block with the search area defined in step 65, as described in further detail below. Step 75 describes generating a system of linear equation computations and solving the system of linear equation computations for a sparse solution. A sparse solution solves (as described in further detail below) a sparse matrix, wherein a sparse matrix is a matrix where the number of zero elements populating the matrix is much greater that the number of non-zero elements populating the matrix. Step 80 describes constructing the closest approximation of the test image block extracted from step 60 using a combination of the shifted reference image blocks extracted in step 70 and the sparse solution found in step 75. Step 85 describes computing the change detection image block (as described in further detail below). In step 89, the method of FIG. 2A describes constructing a final change detection image comparing the constructed image blocks from step 80 to the test image blocks extracted from step 60. These steps are described in further detail below, with reference to FIGS. 3 through 5.

In step 60, test image 35 is divided into many overlapping test image blocks 90a, 90b, 90c, and 90d (collectively test image block or patch 90) (shown in FIG. 3). Each overlapping test image block 90 is processed and integrated with neighboring test image blocks to reduce the edge artifact generated from reconstruction mismatches between adjacent test image blocks. For example, in FIG. 3, test image block 90a is processed and integrated with neighboring test image blocks 90b, 90c, and 90d. The size of test image block 90 is also chosen in step 55 (of FIG. 2) to capture a physical size of an object or target of interest (e.g., in one embodiment the physical size may represent a scaled 1×1 meter area in the area of interest and the object of interest may be a weapon system). In addition, each test image block 90 (e.g., test image block 90a, shown in FIG. 3) may have a down-range dimension 94 of $n_1$ pixels and a cross-range dimension 92 of $m_1$ pixels.

As shown in FIG. 2A, step 55 may be a global operation that aligns the just-collected test image to the set of reference ones. As a pre-processing operation, the first processing step either maximizes the correlation between the test image and all spatially translated (shifted) reference images within a reasonable range or minimizes the sum absolute difference (SAD) between the test image and all spatially translated (shifted) reference images within a reasonable range. Global pre-processing step 55 may ensure that the test and the reference image roughly capture the same scene or physical area. In addition, global pre-processing step 55 may limit the size of the search area in the following local registration and change detection step and thereby improve the accuracy, as well as the complexity, of the local optimization.

In FIG. 2A, step 65 establishes a corresponding search area 100 (shown in FIG. 4) in reference image 95. Search area 100 is optionally the same shape as test image block 90 (e.g., square-shaped), and optionally scaled to a larger size (e.g., twice as large as test image block 90) to cover any misalignment between the two images. The location of search area 100 on reference image 95 approximately corresponds to the position of test image block 90 on test image 35 and may be centered in reference image 95 at the same position as test image block 90a is positioned in test image 35. For example, search area 100 may have a down-range dimension 104 of $n_2$ pixels and a cross-range dimension 102 of $m_2$ pixels. Inside search area 100, reference image block 105 (shown in FIG. 4) may be shifted along a down-range dimension and/or a cross-range dimension, as described in further detail below.

Stated another way, in step 60, test image 35 may be divided into many overlapping test image patches 90, where each test image patch 90 is represented as an M×N matrix whose upper-left element is image pixel $y_{ij}$. In addition, a column vector $Y_{ij}$ may be defined as an MN×1 column vector constructed from stacking N columns of M rows of pixels on top of each other. Next, in step 65, search area 100 is defined as a corresponding (M+Δm)×(N+ΔN), where ΔM is the scaling factor in the M dimension and ΔN is the scaling factor in the N dimension of search area 100 compared to test image block 90.

Step 70, in the method shown in FIG. 2A, generates a local reference dictionary 110 that may include all possible translated reference image blocks 105 (which are of the same size as test image block 90) within the search area 100 in reference image 95. Possible translations include, but are not limited to, translating reference image block 105 along a down-range translation direction 110a and/or along a translation cross-range direction 110b. While creating local reference dictionary 110, each reference image block 105 (shown in FIG. 4) may be referred to as an atom of the local reference dictionary 110.

Stated another way, step 70 constructs a dictionary $D_{ij}$ which includes (2ΔM+1)(2ΔN+1) atoms; $D_{ij}=[x_{i-\Delta M, j-\Delta n}\ x_{i-\Delta M, j-\Delta N+1} \cdots x_{i-\Delta M+1, j-\Delta N} \cdots x_{i+\Delta M, j+\Delta N}]$, where each MN×1 atom is constructed by vectorizing reference image block 105. In other words, the dictionary $D_{ij}$ may contain all or substantially all reference image blocks 105 (in vectorized format) that fit within search area 100. An input parameter K, where K<<MN, defines a K-sparse condition where test image block 90 is best represented as a linear combination of only K atoms from $D_{ij}$.

In FIG. 2A, step 75 constructs a system of linear equation computations (described below) and solves the system of linear equation computations for a sparse solution (described below). The system of linear equation computations built in step 75 includes a column vector of test image blocks 90 and a column vector of reference image blocks 105. Both the column vector of test image blocks 90 and reference image blocks 105 are column vectors of size N, where $N=n_1 \cdot m_1$. In addition, an unknown vector is defined as a column vector of size M, where M is the number of atoms in local reference dictionary 110 that is formed by shifted versions of reference block images 105 within search area 100. From the system of linear equation computations built by step 75, test image block 90 is modeled as a linear combination of a minimum number of shifted versions (e.g., atoms in local reference dictionary 110) of reference image blocks 105.

As described in further detail below, the system of linear equation computations built in step 75 reflects the difference between test image 35 and reference image 95. For example, the system of linear equations built in step 75 may reflect no change between the test image 35 and reference image 95. In the ideal noiseless scenario, when the signatures from the test image 35 and the reference image 105 are identical, a solution vector to the system of linear equation computations built in step 75 includes only one nonzero element of magnitude equal to one. In practice, however, there is small deviation between test image 35 and reference image 95; e.g., subtle changes caused by different image capture geometries between test image 35 and reference image 95. Thus, the solution vector may include more than one nonzero element to compensate for the differences. Even when there is a small difference between test image 35 and reference image 95, however, the number of nonzero elements in the solution vector should not be large (e.g., not statistically significant when compared to the total number of elements in the solution vector). Consequently, the solution vector to the system of linear equation computations built from step 75 in FIG. 2A can be assumed to be a sparse approximated solution of the linear system. In addition, the solution vector may be solved with a restriction indicating the number of nonzero components (degree of sparsity) should not exceed a value K, where K<<N (e.g., K=0.02 to 0.05N). As long as the differences of the signatures between the test image 35 and the reference image 95 are not significant (e.g., not statistically significant—where the total pixel count of the differences between test image 35 and reference image 95 is less than 2% of the total pixel count of either test image 35 or reference image 95), the test image 35 can be well represented by a small number (e.g., statistically insignificant) of nonzero elements in the solution vector (such as 0.02-0.05N, where N is the total number of elements in the solution vector). In other words, step 75 in the method of FIG. 2A transforms signatures from reference image 105 to match to the signatures from test image 90 in order to maximize the suppression of the signatures from the common objects (not shown) between test image 90 and reference image 105. There are numerous techniques for solving the system of linear equation computations for the sparsest solution, any of which may be employed for solving the system of linear equation computations built in step 75. Examples of such techniques include, but are not limited to, linear programming, orthogonal matching pursuit, gradient projection, regularized orthogonal matching pursuit, subspace pursuit, sparsity adaptive matching pursuit, etc. The subspace pursuit technique may be preferred to find the sparsest solution to the linear equation computations built for step 75 when simplicity and relatively fast computations are desired.

In another example, there may be significant changes (e.g., statistically significant) between test image 35 and reference image 95 such that test image block 90 cannot be well represented by a linear combination of shifted versions of reference image blocks 105 due to the imposed restriction on the number of nonzero coefficients (e.g., the value K, described above) to be small compared to the dimension of test image block 90. For example, when the number of nonzero coefficients in the solution vector exceeds 0.02-0.05N, where N is the number of elements in the solution vector, may constitute a significant change between test image 35 and reference image 95. As a consequence, a less successful transformation of reference image blocks 105 to match to test image block 90 has occurred, and the resulting differences would indicate significant changes between test image 35 and reference image 95.

In step 80, the method of FIG. 2A transforms shifted versions of reference image blocks 105 to match to corresponding test image block 90. A reconstructed image block (not shown) is generated by a matrix-vector multiplication: local reference dictionary 110 and the solution vector found in step 75. Reconstructed image block (not shown) may therefore represent a transformation of reference image blocks 105 to match to test image block 90.

In step 85, the method of FIG. 2A computes a change detection image block 115. Change detection image block 115 is generated by computing an absolute difference between test image block 90 and reconstructed image block (not shown). A first scaling factor, $\beta_1$, in computing change detection image block 115 may be applied as $\beta_1$. For example, $\beta_1$ may be defined as:

$$\beta_1 = \sum_{k=1}^{M}|\alpha_{ik}^D| + \sum_{k=1}^{N}|\alpha_{ik}^N|$$

and may include a measure of the degree of sparsity of the solution of the system of linear equation computations determined in step 70. When there is no change between test image 35 and reference image 95, the value of $\beta_1$ is small (e.g., statistically insignificant) since the transformation from reference image blocks 105 to match test image block 90 can be accomplished by only a few coefficients (e.g., the number of nonzero coefficients in the solution vector is in the order of 0.02 to 0.05N, where N is the total number of elements in the solution vector) of small magnitude. However, if the signatures change significantly between test image 35 and reference image 95 (indicating a change not attributable to capture conditions in image acquisition unit 10, such as misalignment), the solution vector calculated in step 75 will not be sparse, resulting in a large value (e.g., statistically significant) for $\beta_1$. In other words, the number of coefficients as well as their magnitude values would increase significantly (e.g., the number of nonzero coefficients in the solution vector is greater than 0.02 to 0.05N, where N is the total number of elements in the solution vector). Thus, using, $\beta_1$ as a weighting factor for the change detection image would enhance the portions of the captured images (e.g., as captured by image acquisition unit 10) where there are changes between captured images of the area of interest. A second scaling factor when computing change detection image block 115 that may be applied is $$\frac{1}{\sigma_{s_i}^2},$$

where $\sigma_{s_i}^2$ is the variance of the $i^{th}$ search image block 105. In addition, change detection image 120 (shown in FIG. 5) has the same size as the test image 35 and is initialized to have all zero values at the beginning of the change detection process.

In step 85, change detection image block 115 is added to change detection image 120 at the location that corresponds to the test image block 90 (shown in FIG. 3).

Step 87 in FIG. 2A determines whether all test image blocks 90 have been processed and when all test image blocks 90 have been processed, step 89 generates a change detection image 120 that is an integrated image to illustrate the changes between test image 35 and reference image 95. Otherwise, step 88 returns to step 60 to repeat the processing of another test image block 90 in test image 35.

In general, the change detection processor 40 (of FIG. 1) operates on data stream x. Data stream x comprises length N, and is said to be K-sparse (or K-compressible) if x can be well approximated using K<<N coefficients under some linear transform (e.g. discrete wavelet transform (DWT), discrete Fourier transform (DFT), or some constructed dictionary). Such a data stream x can be acquired through a series of incoherent linear projections, y=Φx (Equation 1A), where y is the vector with M entries containing the measurements and Φ represents an M×N incoherent sensing matrix. According to the embodiments herein, x can be faithfully recovered from only M=O(K log N) measurements via solving the following sparsity-driven problem $\hat{\alpha}$=arg min$\|\alpha\|_0$ s.t. y=Φx=ΨΦα=Aα (Equation 2A) and the original signal can be reconstructed as x*=Ψα*. The $L_p$-norm of the vector α is defined as $\|\alpha\|_p$=$^p\sqrt{|\alpha_i|^p}$ whereas the $L_0$-norm of α is the number of significant (non-zero) elements. Under several mild conditions well-known in the literature, the $L_0$-norm minimization problem above can be efficiently solved by recasting it as a convex linear programming problem $\hat{\alpha}$=arg min$\|\alpha\|_1$ s.t. y=Φx=ΨΦα=Aα (Equation 3A). In any case, the reconstructed information can be generally regarded as the sparsest (or most compressible) solution from many candidate solutions of the under-determined Equation 1A.

Moreover, as those skilled in the art would understand from the above, sparsity setting K (as defined in step 75 of FIG. 2A) controls the trade-off between detection versus false-alarm rate. A higher sparsity setting may lead to lower residual error, hence improving clutter suppression but may also weaken target detection. In addition, the size of the search area 100 controls (as defined in step 65 of FIG. 2A) effects the robustness of the method shown in FIG. 2A, with respect to registration. As shown above, the embodiments herein can effectively handle any translational registration mismatch within the range [±ΔM,±ΔN]. Those skilled in the art, however, would understand that enlarging the size of the search area 100 may increase the misdetection rate. In addition, as described above, the global registration pre-processing step 55 may further optimize the size of the search area by restricting the local search to a local mismatch.

Incrementing the overlap settings (e.g., $\delta_i$ and $\delta_j$, where $\delta_i$ corresponds to the amount of overlap in the cross-range dimension and corresponds to the amount of overlap in down-range dimension) provide the trade-off between refinement and complexity. They can range from unity (moving image patch one pixel at a time—most accurate detection) to M, N (non-overlapped patches—lowest computational requirement).

FIG. 6, with reference to FIGS. 1 through 5, illustrates a flow diagram of a method of change detection according to an embodiment herein. Step 130 inputs reference image X (e.g., reference image 95) and test image Y (e.g., test image 35). Step 135 performs a global registration between test image and reference image, via maximization of correlation. Step 140 defines the parameter settings, where the parameters set may include setting an image patch size (e.g., cross-range dimension 92 and down-range dimension 94) to M×N=1×1 to 2×2 m, setting a targeted sparsity level to K=0.02 MN to K=0.05 MN, setting a search window size (e.g., search area 100) to ΔM=M, ΔN=N and setting a 50% overlap between image patches: $\delta_i$=M/2; $\delta_j$=N/2. Step 140 partitions test image Y (e.g., test image 35) into overlapping test image patches (e.g., test image blocks 90). Step 145 processes each image patch $Y_{ij}$, where processing each test image patch $Y_{ij}$ (e.g., test image blocks 90) may include any combination of the following: constructing a local dictionary $D_{ij}$ (e.g., local reference dictionary 110) from the reference image (e.g., reference image blocks 105); solving an $L_0$-norm optimization problem (e.g., step 75 shown in FIG. 2A); computing the sparse prediction patch (e.g., step 85 shown in FIG. 2A), and computing the residual prediction errors (e.g., step 85 shown in FIG. 2A). Step 150 increments i and j by $\delta_i$ and $\delta_j$ to cover the entire test image Y. Step 155 outputs a global prediction $\hat{Y}$, $L_1$-norm coefficient map L, and scaled change detection $\hat{E}$ image, which are generated from averaging all local patches $\hat{y}_{ij}$, $\|\hat{\alpha}_{ij}\|_1$, $\hat{e}_{ij}$, respectively, in overlap-add fashion (e.g., steps 80 and 87 shown in FIG. 2A).

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein may comprise hardware and software embodiments. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A more general representation of the hardware environment for practicing the embodiments herein is depicted in FIG. 7. This schematic drawing illustrates hardware configuration 200 of an information handling/computer system in accordance with the embodiments herein. Hardware configuration 200 comprises at least one processor or central processing unit (CPU) 210. The CPUs 210 are interconnected via system bus 212 to various devices such as a random access memory (RAM) 214, read-only memory (ROM) 216, and an input/output (I/O) adapter 218. The I/O adapter 218 can connect to peripheral devices, such as disk units 211 and tape drives 213, or other program storage devices that are readable by the system. The system can read the inventive instructions on the program storage devices and follow these instructions to execute the methodology of the embodiments herein. The system further includes a user interface adapter 219 that connects a keyboard 215, mouse 217, speaker 224, microphone 222, and/or other user interface devices such as a touch screen device (not shown) to the bus 212 to gather user input. Additionally, a communication adapter 220 connects the bus 212 to a data processing network 225, and a display adapter 221 connects the bus 212 to a display device 223 that may be embodied as an output device such as a monitor, printer, or transmitter, for example.

Change detection results using SAR simulation data. FIG. 8A shows a reference SAR image formed using SAR simulation data whereas FIG. 8B depicts a test SAR image that is collected and generated at a different time with three new targets introduced in the scene. The image signatures of the eight clutter objects presented in both scenes are different between the test image and the reference image. The differences in the signatures (shapes and amplitudes) represent the radar calibration mismatch between two different runs. In addition to signature mismatches, there is also a misalignment between the two images due to variations in geometry (radar aperture) between the two runs. FIG. 8C illustrates the standard difference change detection result (after a manual global image registration process). The suppression of signatures for these common objects completely fails due to the local image registration problem and the changes in signatures between runs. FIG. 9A shows the reconstruction image (using the SIRE-CD). Here, signatures of the seven common clutter objects are well matched to those of the test image. On the other hand, the signatures of the three targets are poorly reconstructed. FIG. 9B depicts the difference between the test image and the reconstructed image. Pixels at three target locations show up clearly in the image, while the signatures of the other four common objects are well suppressed. FIG. 9C shows the false color plot of the L1-norm coefficients, which is a rough measure of the degree of sparsity of the optimal solution, indicating the difficulty level that the sparse optimization process encounters while trying to represent the test image via the reference. From FIG. 9C, the values of the L1-norm coefficients are high at the three target locations and remain very low at the remaining clutter areas, implying that this L1-norm map contains valuable information that can be used to weight the change detection image to enhance the change locations. FIG. 9D illustrates the final change detection image using L1 weighting information. Note that the target locations are detected while clutters are completely eliminated.

Change detection results using ARL UWB SAR radar. FIGS. 10A and 10B depict the reference and test SAR images from the ARL UWB forward-looking SAR radar. There are seven ground truth targets (label with circles). Some have very small signature amplitudes and are located next to significant clutter objects, presenting a very challenging situation. FIG. 10C graphs the false color plot of the coefficient L1-norm. All seven targets are detected with two "legitimate" false alarms, one of which is caused by the spurious signal from the radar hardware. FIG. 10D plots the residual change detection image scaled by the L1-norm and the standard deviations of the local reference patches. Inspecting the sparsity-driven optimization for two cases involving the sparsity constrained joint image registration and change detection (SIRE-CD) technique of a preferred embodiment, FIGS. 11A-D demonstrate a first hypothesis where there is an incoming target that is not present in the reference image. FIG. 11C shows the sparse reconstruction of the target signature from the reference image data. The reconstruction signature poorly represents the target signature because of the low sparsity level imposed in the process. This difference in signature indicates the change in the image scene. The L1-norm false color map in FIG. 11C indicates the presence of many large coefficients, further confirming the detection of the target. FIGS. 12 A-D illustrate a second hypothesis where there is no change in the scene between the reference and test image. FIGS. 12A-D show the signatures of the same clutter object from the reference and the test image respectively. The difference in the signatures of the same clutter object (as confirmed visually) is a major challenge for any change detection algorithm. FIG. 12C depicts the sparse prediction of the test clutter from the reference clutter signature. The optimization process has successfully found a good match. The residual error is low while the L1-norm map in FIG. 12D reveals that the coefficients used in the sparse representation are very small, indicating that there is not much change between the two images.

A preferred embodiment described in the foregoing provides a locally-adaptive sparsity-driven joint registration and change detection approach for, among other applications, SAR imagery. At the image patch level, an optimal subspace is sought that can be constructed from the reference data via a L0- or L1-norm sparsity guidance optimization process. The accuracy level of this representation determines the detected changes between the reference and the test image. The perfect alignment between the reference and test images is achieved by the built-in registration—the sparse optimization process automatically decides what the best local alignment for each signature is. Surprisingly, the L1-norm information is very effective in detecting the changes between the two images. Combining this L1-norm information and the change detection result provides significant improved performance in change detection approach. Demonstrated in the foregoing is the SIRE-CD performance using both simulated and real forward-looking SAR data from ARL radar.

As described above, the embodiments herein are improvements over the existing systems because the embodiments herein may, as an option, simultaneously perform image registration and change detection (e.g., using change detection processor 40). In so doing, the embodiments herein achieve very good and robust image registration since the changes in geometry are best captured by performing image registration locally (i.e., using local reference dictionary 110). In addition, the embodiments herein also achieve very good suppression of the signatures of common objects via the transformation process to match the signatures from the reference image 95 to the corresponding signatures from the test image 35. Moreover, the embodiments herein are not limited to just two images 35, 95 and can perform change detection using a database 50 of multiple reference images. Furthermore, the embodiments herein can employ more than one reference image 95 (e.g., multiple reference images 95 retrieved from database 50) to generate a local reference dictionary 110 for the transformation process, and in so doing, capture more variations of signatures from the same object due to a richer local reference dictionary 110.

As used herein, the terminology "sparsity driven" of "sparsity-driven" is a relative term relating to the finding of a compressible solution which is intended to be treated broadly. For example, a sparse matrix is a matrix with enough zeros that it pays to take advantage of them; commonly interpreted from an economics view point in that if one can save time and memory by exploiting the zeros, then a matrix is sparse. The terminology sparsity refers to the selection of a model, within a hierarchy of model classes, that yields a compact representation; i.e. a model that depends on only a few of the observations, selecting a small subset of features for classification or visualization. Selection of an optimal representation which is sufficiently sparse enables efficient computation by optimization techniques and alleviates the extreme difficulty encountered without sufficient sparsity.

As used herein, the terminology "target" area means area of interest, which may be, for example, a scene, an animal or human body or portion thereof, face (as in face recognition), object, ground region, field, landscape, aerial environment, or a combination thereof.

As used herein the terminology "subimage" or "sub image" means a portion of an image (also referred to herein as a patch), or the like.

The foregoing description of the specific embodiments are intended to reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for detecting changes by comparing images which cover the same physical area but are collected at different times, the system comprising:
at least one input for inputting at least one reference image and at least one test image of a target area; the reference and test images of the target area having signatures representing outstanding features;
at least one processor operating to divide the at least one reference image into a plurality of reference subimages; the at least one processor operating to divide the test image into a plurality of test subimages;
at least one memory for storing the at least one reference image and the corresponding reference subimages taken at or near the target area at various times, the at least one processor operating to create a sparse image representation of the target area from one of at least one reference image or reference subimages the at least one processor operating to compare the test image to the sparse image representation by matching signatures from the test image to the sparse image representation in order to align the images and detect changes between the test image and the sparse image representation.

2. The system of claim 1 wherein the sparse image representation is a combination of the reference subimages which are extracted from different reference images and wherein the sparse image representation is determined from an optimization process comprising one of linear programming, orthogonal matching pursuit, gradient projection, subspace pursuit, or any similar sparsity-driven algorithm.

3. The system of claim 1 wherein the test subimages can be selected in either overlapping or non-overlapping fashion and wherein the reference image comprises overlapped subimages having substantially the same dimensions as the test subimages.

4. The system of claim 1 wherein the sparse image representation is a subimage Y of the target area, where $Y=D\alpha$, where $\alpha$ is a sparse coefficient vector containing at most K non-zero entries and D is a dictionary constructed from reference overlapped subimages and wherein the sparse image representation is obtained by orthogonal matching pursuit, gradient projection, subspace pursuit, or any similar sparsity-driven algorithms.

5. The system of claim 4 wherein the test image Y is first divided into many overlapping test subimages $Y_{ij}$, each represented as an M×N matrix which may be represented as $$Y_{ij} = \begin{bmatrix} y_{i,j} & \cdots & y_{i,j+N-1} \\ \vdots & \ddots & \vdots \\ y_{i+M-1,j} & \cdots & y_{i+M-1,j+N-1} \end{bmatrix}$$

where $y_{ij}$ is an image pixel having the coordinates (i,j), and the corresponding vector $y_{ij}$ is a column vector having a length MN constructed from stacking N columns of $Y_{ij}$, each having M members on top of each other, and wherein the at least one reference image comprises a reference image X that is divided into many corresponding (M+2ΔM)×(N+2ΔN) search areas $S_{ij}$ (where ΔM has an integer displacement value not greater than M and ΔN is an integer displacement value not greater than N) in the reference image X is defined as $$S_{ij} \equiv \begin{bmatrix} x_{i-\Delta M, j-\Delta N} & \cdots & x_{i-\Delta M, j+\Delta N+N-1} \\ \vdots & \ddots & \vdots \\ x_{i+\Delta M+M-1, j-\Delta N} & \cdots & x_{i+\Delta M+M-1, j+\Delta N+N-1} \end{bmatrix}$$

from which a dictionary $D_{ij}$ is constructed consisting of (2ΔM+1)(2ΔN+1) atoms, each atom is a vector of exactly the same dimension as the test vector $y_{ij}$ and where $D_{ij}$ is defined as $D_{ij}=[x_{i-\Delta M,j-\Delta N}\ x_{i-\Delta M,j-\Delta N+1} \cdots x_{i-\Delta M+1,j-\Delta N} \cdots x_{i+\Delta M,j+\Delta N}]$ where each vector $x_{ij}$ atom having length MN is constructed by stacking the columns of the reference subimage defined as $$X_{ij} = \begin{bmatrix} x_{i,j} & \cdots & x_{i,j+N-1} \\ \vdots & \ddots & \vdots \\ x_{i+M-1,j} & \cdots & x_{i+M-1,j+N-1} \end{bmatrix}.$$

6. The system of claim 5 wherein the dictionary $D_{ij}$ is appended by adding columns of the matrix $\mu_{Sij} I$, where $\mu_{Sij}$ is a scalar representing the mean of the pixel absolute values of the reference search area $S_{ij}$ and I, where I is the M×N identity matrix.

7. The system of claim 5 wherein in order to determine the sparsest representation the following problem is solved using $\hat{y}_{ij}$ representing the sparse approximation of the test subimage $y_{ij}$ and wherein $\hat{y}_{ij}$ is defined as $\hat{y}=D_{ij}\alpha_{ij}$, and wherein $\hat{\alpha}_{ij}$ is the solution of the optimization $$\hat{\alpha}_{ij}=\arg\min\|\alpha_{ij}\|_0\ s.t.\ y_{ij}=D_{ij}\alpha_{ij}$$

wherein $\alpha_{ij}$ is any vector having N entries of which there are at most K non-zero entries, where k is in the range of 0.02 to 0.05 N, and wherein the solution of the optimization is obtained using one of linear programming, orthogonal matching pursuit, gradient projection, or subspace pursuit.

8. The system of claim 7 wherein the absolute difference between the test subimage $y_{ij}$ and the spare representation $\hat{y}_{ij}$ is the residual representation error defined as $$e_{ij}=|y_{ij}-\hat{y}_{ij}|$$

and any scaled version of the residual representation error is defined as $$e'_{ij}=C_{ij}e_{ij}$$

where $C_{ij}$ is a real positive scaling scalar computed from a combination of the local statistics of the test subimage $y_{ij}$, and/or the local statistics of the reference subimages $x_{ij}$ to determine whether or not changes have taken place within the image of the target area near image location j by comparing the energy of $e_{ij}$ and/or $e'_{ij}$ to a predetermined value.

9. The system of claim 1 wherein the at least one processor operates to find the optimal sparse image representation of the reference subimages as a linear combination of the corresponding reference subimages within a search area stored in the at least one memory.

10. The system of claim 1 wherein image registration and suppression of common signatures that are presented in both the test and reference images are performed simultaneously.

11. The system of claim 10 wherein the test image is divided into many overlapping subimages $Y_{ij}$ defined as $$Y_{ij} = \begin{bmatrix} y_{i,j} & \cdots & y_{i,j+N-1} \\ \vdots & \ddots & \vdots \\ y_{i+M-1,j} & \cdots & y_{i+M-1,j+N-1} \end{bmatrix},$$

and where the test subimage vector $y_{ij}$ is constructed by stacking columns of the matrix $Y_{ij}$; and wherein the corresponding search area $S_{ij}$, is defined as $$S_{ij} \equiv \begin{bmatrix} x_{i-\Delta M,j-\Delta N} & \cdots & x_{i-\Delta M,j+\Delta N+N-1} \\ \vdots & \ddots & \vdots \\ x_{i+\Delta M+M-1,j-\Delta N} & \cdots & x_{i+\Delta M+M-1,j+\Delta N+N-1} \end{bmatrix}.$$

from which a dictionary Dij is constructed consisting of $(2\Delta M+1)(2\Delta N+1)$ atoms, each atom is a vector of exactly the same dimension as the test vector yij, and where Dij is defined as Dij=$[x_{i-\Delta M,j-66\ N}\ x_{i-\Delta M,j-66\ N+1}\ \cdots\ x_{i-\Delta M+1,j-\Delta N}\ \cdots\ x_{i+\Delta M,j+\Delta N}]$ where each vector $x_{ij}$ having length MN is constructed by stacking the columns of the reference subimage $X_{ij}$ defined as $$X_{ij} = \begin{bmatrix} x_{i,j} & \cdots & x_{i,j+N-1} \\ \vdots & \ddots & \vdots \\ x_{i+M-1,j} & \cdots & x_{i+M-1,j+N-1} \end{bmatrix}.$$

12. The system of claim 11 wherein $\hat{y}_{ij}$ is the sparse approximation of the test subimage $y_{ij}$ and wherein $\hat{y}_{ij}$ is defined as $\hat{y}=D_{ij}\alpha_{ij}$, and wherein $\hat{\alpha}_{ij}$ is the solution of the optimization $$\hat{\alpha}_{ij}=\arg\min\|\alpha_{ij}\|_0\ s.t.\ y_{ij}=D_{ij}\alpha_{ij}$$

wherein $\alpha_{ij}$ is any vector having N entries of which there are at most K non-zero entries, where K is in the range of approximately 1% to 25% of N, and wherein the solution of the optimization is obtained using, one of linear programming, orthogonal matching pursuit, gradient projection, subspace pursuit.

13. The system of claim 12 wherein the absolute difference between the test subimage $y_{ij}$ and the sparse approximation $\hat{y}_{ij}$ of the test subimage is the residual representation error defined as $$e_{ij}\equiv|y_{ij}-\hat{y}_{ij}|$$

and any sealed version of the residual representation error is defined as $$e'_{ij}\equiv C_{ij}e_{ij}$$

where $C_{ij}$ is a real positive scaling scalar computed from a combination of the local statistics of the test subimage $y_{ij}$, and/or the local statistics of the reference subimages $x_{ij}$ to determine whether or not changes have taken place within the image of the target area near image location ij by comparing the energy of $e_{ij}$ and/or $e'_{ij}$ to a predetermined value.

14. The system of claim 1 wherein the reference image comprises a plurality of stored reference images and wherein the range of the subimage size is M×N=1×1 to 2×2 meters, and wherein there is a certain amount of overlap between subimages.

15. The system of claim 1, wherein the at least one processor extracts a test subimage from the test image and establishes a search area in the reference image at approximately the same location in the target area as the test subimage, the at least one processor operating to extract shifted reference subimages, the at least one processor operating to generate a system of linear equations relating the shifted reference subimages and to the test subimage, and the at least one processor operating to solve the system of linear equation computations for a sparse image representation of the test subimage, the at least one processor operating to compute the residual error between the test subimage and the sparse image representation, and compute a change detection subimage from the residual error, and the at least one processor operating to construct a change detection image from a plurality of change detection subimages.

16. A computerized method of detecting changes in a target area by comparing an input test image to at least one reference image comprising:

dividing the test image into many overlapping test subimages;

defining a search area in the at least one reference image;

extracting reference subimages located entirely within the search area from the at least one reference image and converting the reference subimages and the test subimages to reference subimages vector and test subimage vector by stacking columns of the subimages deriving a sparse representation of the test subimage vector utilizing a sparse linear combination of reference subimage vectors;

computing a residual representation error defined as a absolute different between the test subimage and the sparse representation; and constructing a change detection image based upon the residual representation error.

17. The method of claim 16 further comprising iteratively repeating the steps of wherein dividing the test image; defining a search area; extracting reference subimages, deriving a sparse representation; computing the residual representation error and constructing a change detection image by using test subimages representing other portions of the target area; and wherein the dividing the test image comprises dividing the test image Y into many overlapping subimages $Y_{ij}$, each defined as an M×N matrix with the top left element being $y_{ij}$ where $Y_{ij}$, is defined as $$Y_{ij} = \begin{bmatrix} y_{i,j} & \cdots & y_{i,j+N-1} \\ \vdots & \ddots & \vdots \\ y_{i+M-1,j} & \cdots & y_{i+M-1,j+N-1} \end{bmatrix}$$

and where the subscript i and j are used to index the image pixel $y_{ij}$ or subimage location $Y_{ij}$; and wherein defining a search area comprises extracting the corresponding $(M+2\Delta M)\times(N+2\Delta N)$ search area $S_{ij}$ in the reference image X defined as $$S_{ij} \equiv \begin{bmatrix} x_{i-\Delta M,j-\Delta N} & \cdots & x_{i-\Delta M,j+\Delta N+N-1} \\ \vdots & \ddots & \vdots \\ x_{i+\Delta M+M-1,j-\Delta N} & \cdots & x_{i+\Delta M+M-1,j+\Delta N+N-1} \end{bmatrix}$$

where ΔM is an integer displacement value not greater than M and ΔN is an integer displacement value not greater than N; and wherein extracting reference subimages within the search areas to construct a dictionary $D_{ij}$ consisting of $(2\Delta M+1)(2\Delta N+1)$ vectors, each vector having the same dimension as that of the test subimage vector $y_{ij}$, and where $D_{ij}$ is defined as $$D_{ij} = [x_{i-\Delta M, j-\Delta N}\ x_{i-\Delta M, j-\Delta N+1} \cdots x_{i-\Delta M+1, j-\Delta N} \cdots x_{i+\Delta M, j+\Delta N}]$$

and where each vector $x_{ij}$ having length MN is constructed by stacking columns of the target subimage $X_{ij}$, defined as $$X_{ij} = \begin{bmatrix} x_{i,j} & \cdots & x_{i,j+N-1} \\ \vdots & \ddots & \vdots \\ x_{i+M-1,j} & \cdots & x_{i+M-1,j+N-1} \end{bmatrix}$$

and wherein deriving a sparse representation of the test subimage comprises a sparse linear combination of the reference subimages stored in the dictionary $D_{ij}$ by solving the optimization problem in the following equation $$\hat{\alpha}_{ij} = \arg\min \|\alpha_{ij}\|_0\ s.t.\ y_{ij} = D_{ij}\alpha_{ij}$$

wherein $\alpha_{ij}$ is any vector having N entries of which there are at most K non-zero entries, where K is in the range of approximately 0.02 to 0.05N, and wherein the solution of the optimization is obtained using one of linear programming, orthogonal matching pursuit, gradient projection, subspace pursuit;

and wherein computing a sparse representation of the test subimage comprises using the equation $$\hat{y}_{ij} = D_{ij}\hat{\alpha}_{ij}$$

where $\hat{y}_{ij}$ is the sparse representation of the test subimage $y_{ij}$.

18. The method of claim 16 wherein the test subimage is moved to cover other positions of the target area and wherein computing the change detection comprises using the residual error $e_{ij}$ defined as $$e_{ij} = |y_{ij} - \hat{y}_{ij}|,$$

or any scaled version of the residual error is defined as $$e'_{ij} = C_{ij}e_{ij}$$

where $C_{ij}$ is a real positive scaling scalar computed from a combination of the local statistics of the test subimage $y_{ij}$, and/or the local statistics of the reference subimages $x_{ij}$ to determine whether or not changes have taken place within the image of the target area near image location ij by comparing the energy of $e_{ij}$ and/or $e'_{ij}$ to a predetermined value; and wherein the constructing of a change detection image based upon the residual representation error comprises outputting the scaled change detection image generated from averaging all the residual errors.

19. The method of claim 16 wherein the deriving of a sparse representation of the test subimage vector comprises creating a sparse representation by selecting and linearly combining reference subimage vectors;

making comparisons of the sparse representation to the test subimage for similarities;

producing the residual error between the test subimage and the sparse representation; and comparing the energy of the residual error to a predetermined threshold to identify changes.

20. A method, executed by a computing device, of performing change detection of images, said method comprising:

providing a test image and a reference image;

setting change detection parameters by:

setting a test subimage size to M×N, where M is a first numeric value along a down-range dimension and N is a second numeric value along a cross-range dimension;

setting a desired sparsity level to a numeric value between 0.02MN and 0.05MN;

setting a search window size to $(M+\Delta M)\times(N+\Delta N)$, where ΔM is a first added numeric value that is added to said first numeric value and ΔN is a second added numeric value that is added to said second numeric value;

selecting a different test subimage to cover another portion of the target area;

processing each said different test subimage by:

constructing a local dictionary from said reference image;

computing a sparse representation of the test subimage from the local dictionary;

computing a residual representation error between the test subimage and the corresponding representation; and outputting a change detection image to detect any change between said test image and said reference image.

* * * * *